Nov. 10, 1964  F. M. BIRD ETAL  3,156,238
DEVICE FOR AIDING IN THE ADMINISTRATION OF
GASEOUS ANESTHETIC AGENTS
Filed Feb. 18, 1960  13 Sheets-Sheet 1

INVENTORS
FORREST M. BIRD
HENRY L. POHNDORF
BY
ATTORNEY

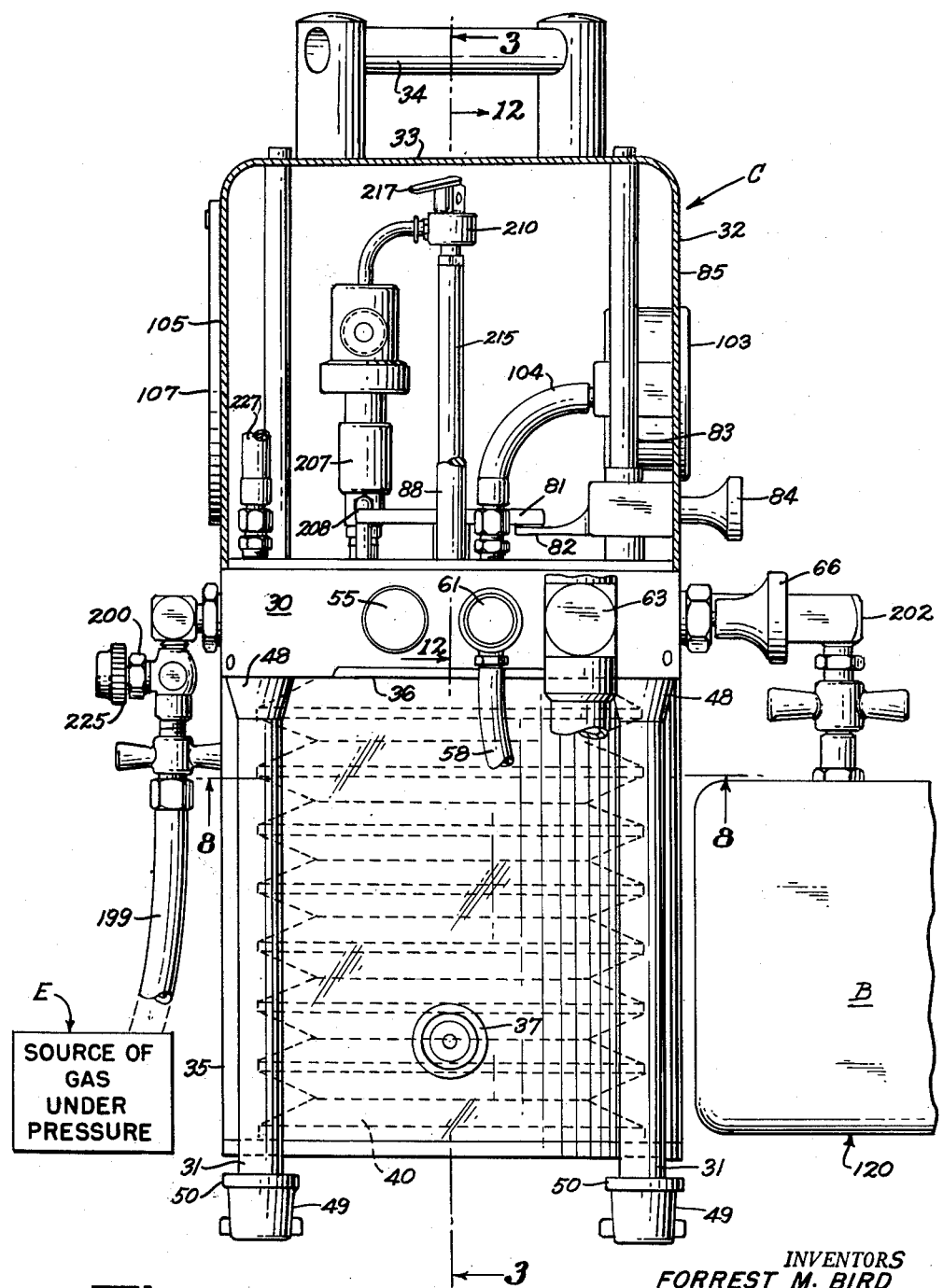

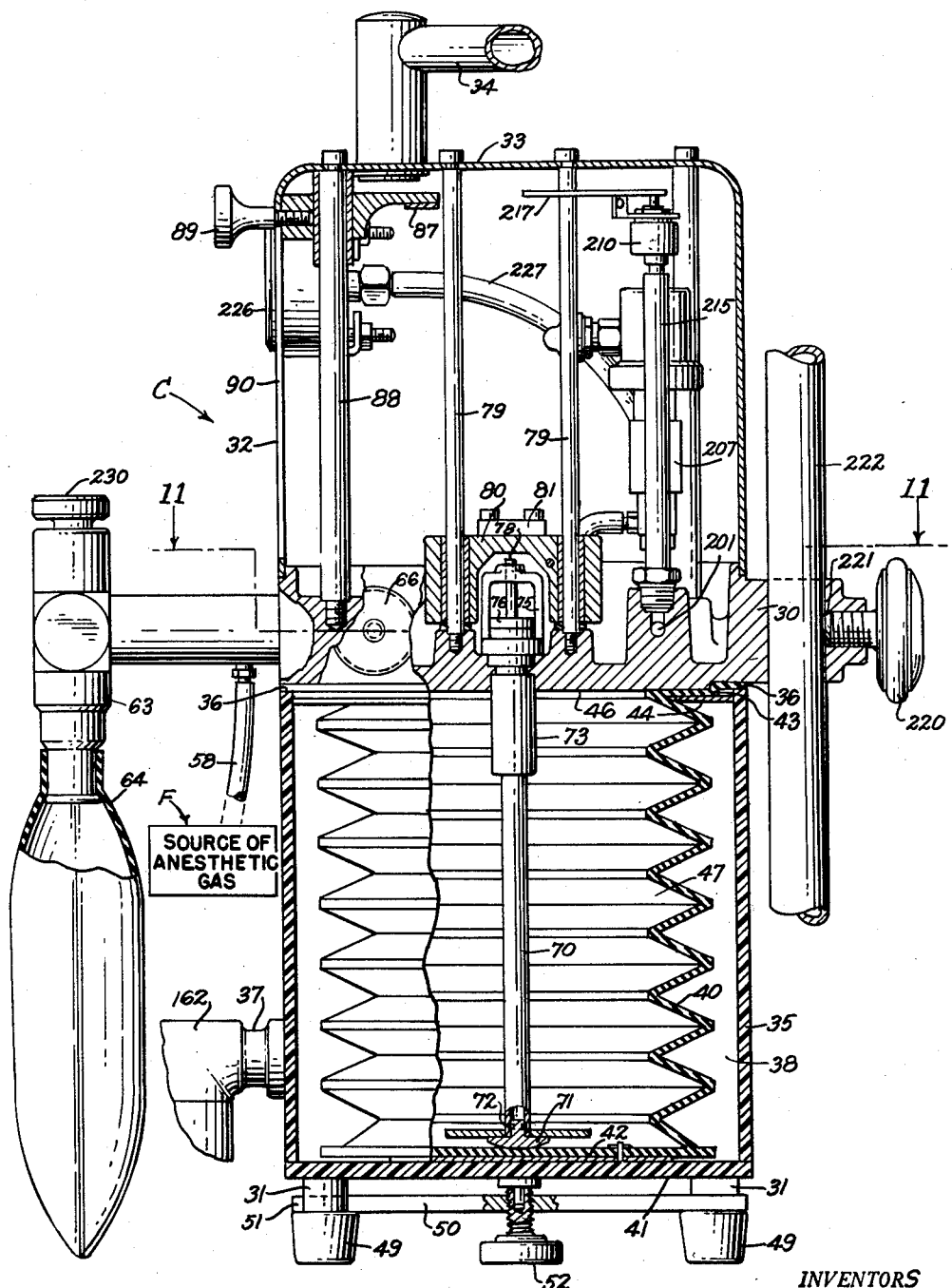

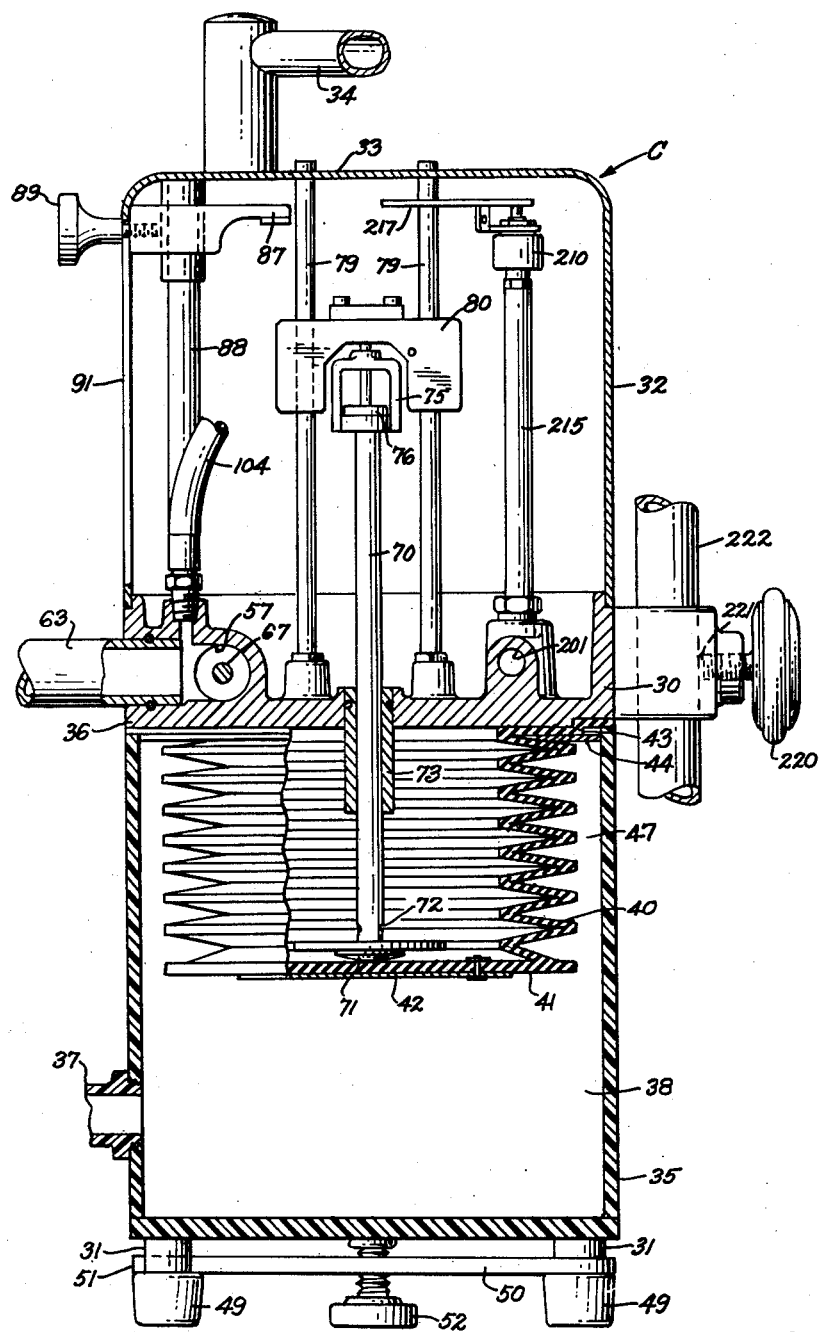

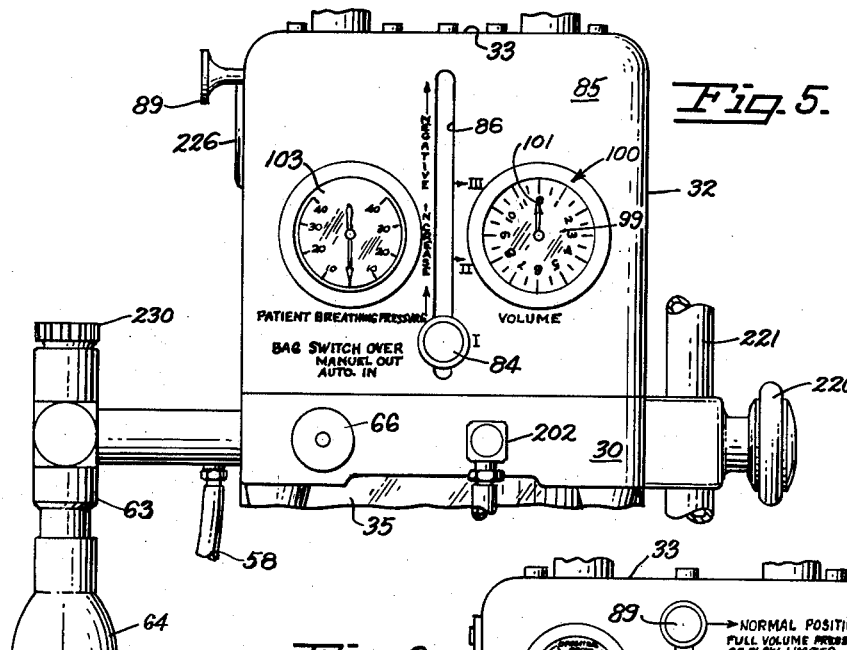
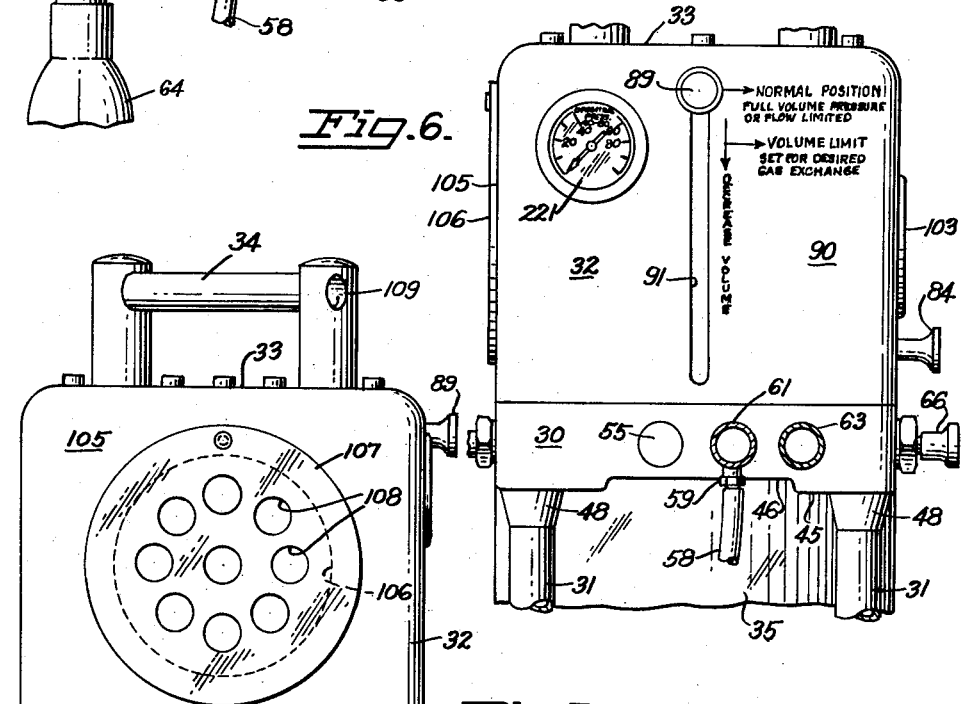
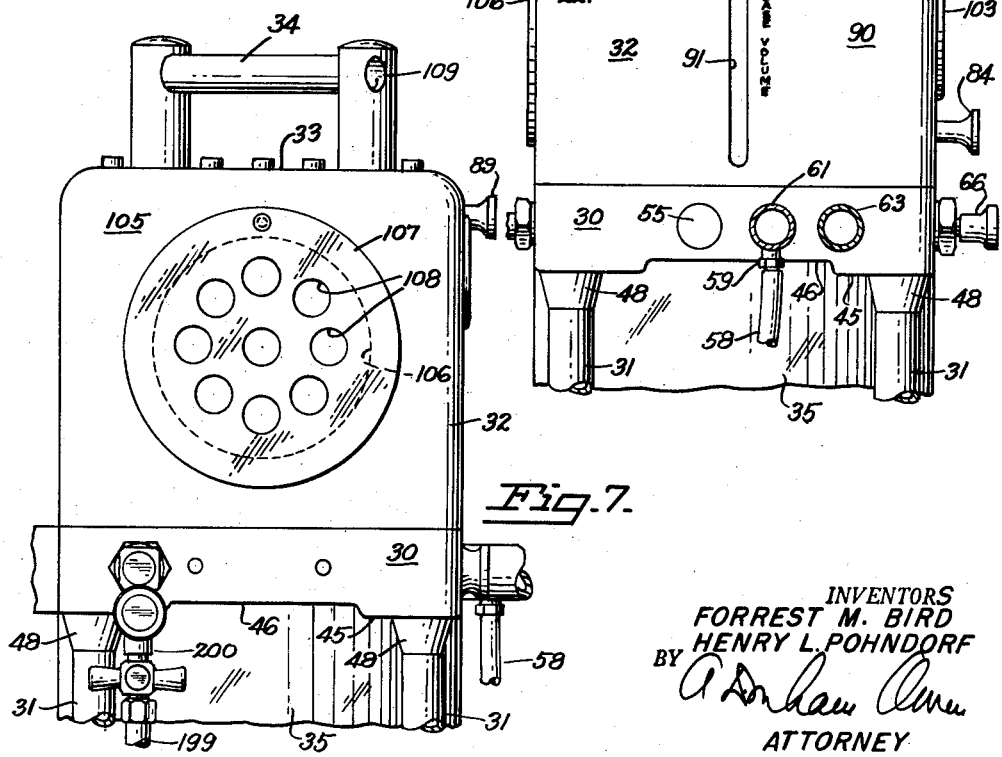

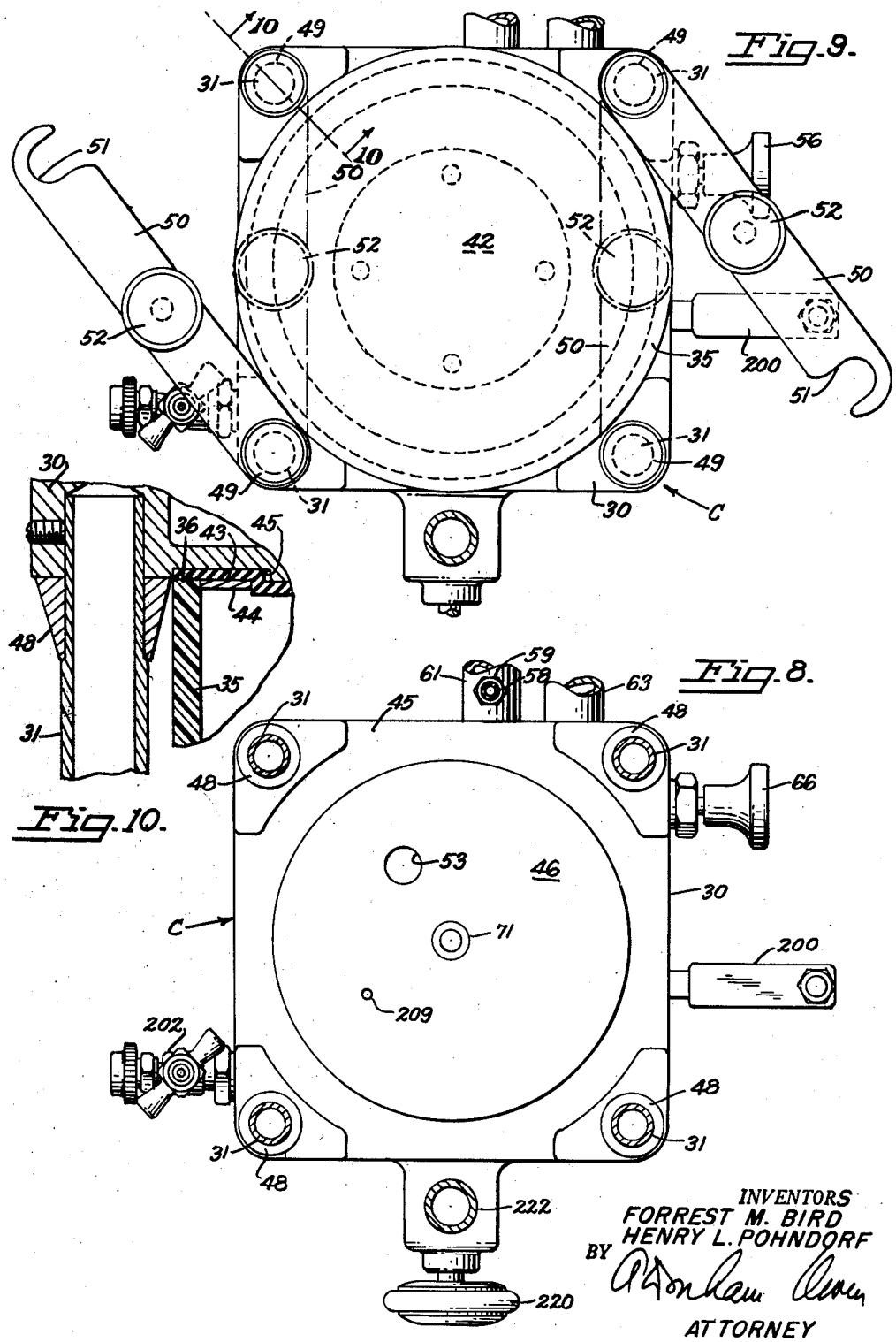

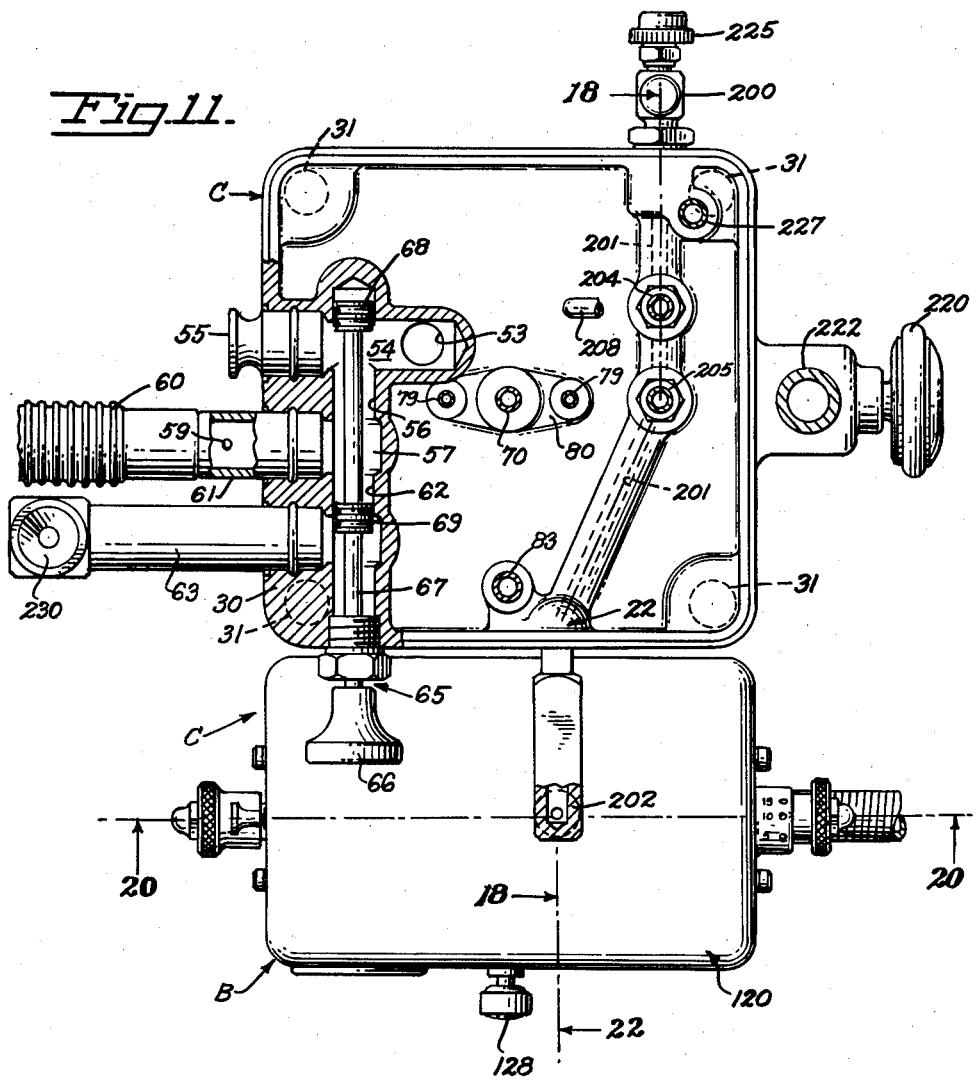

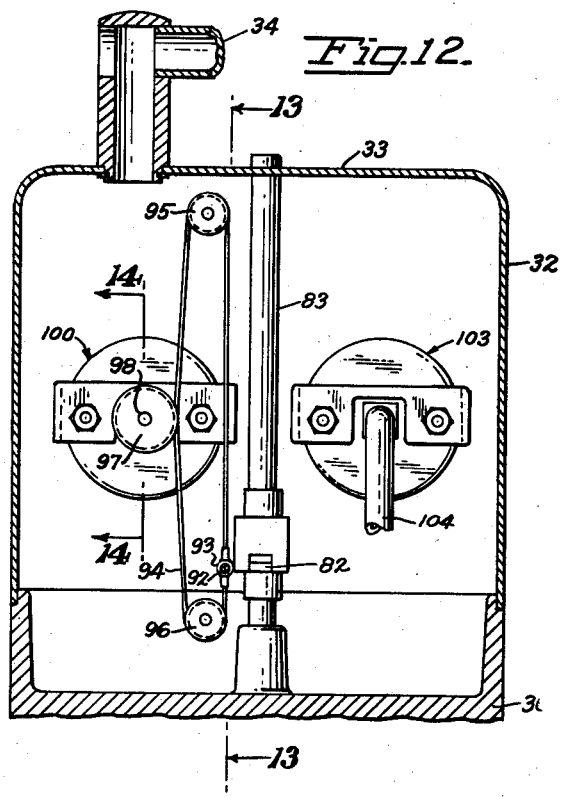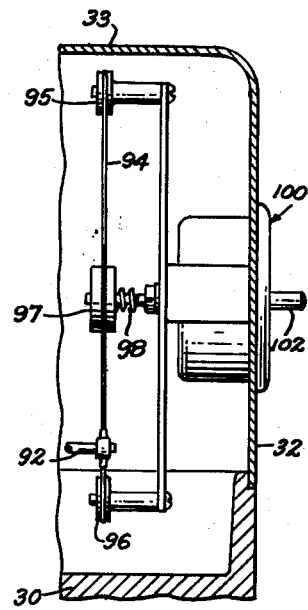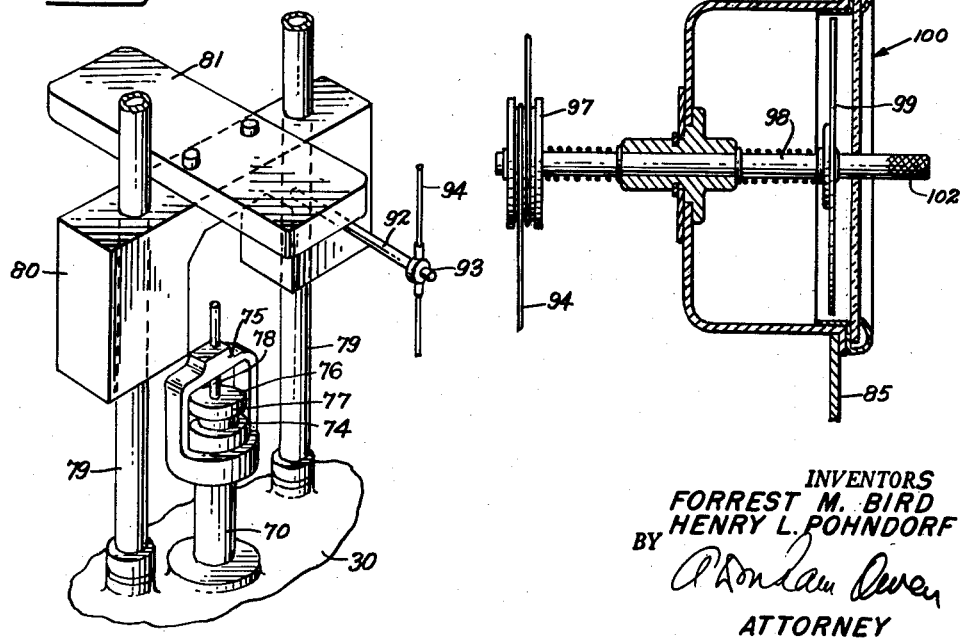

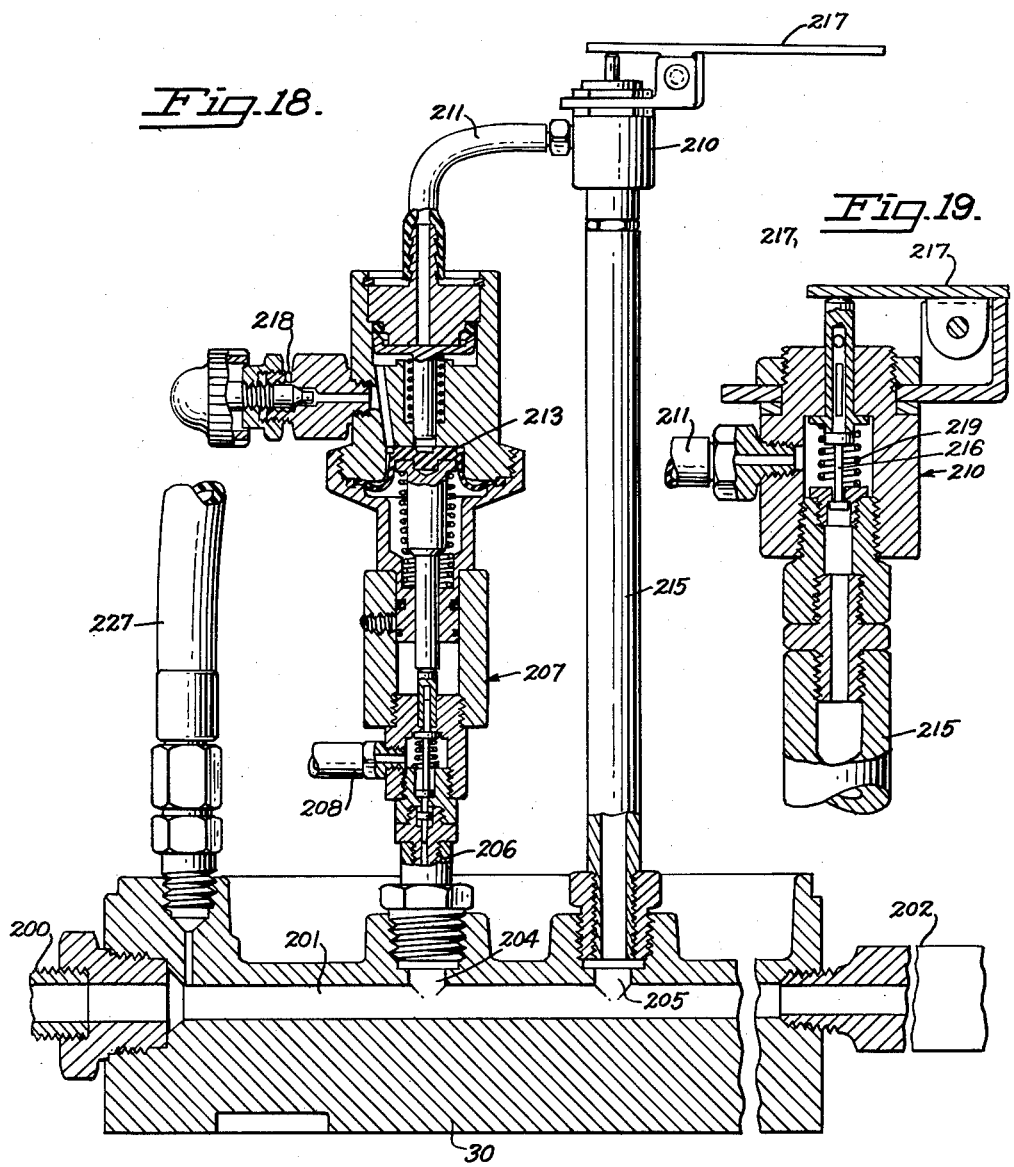

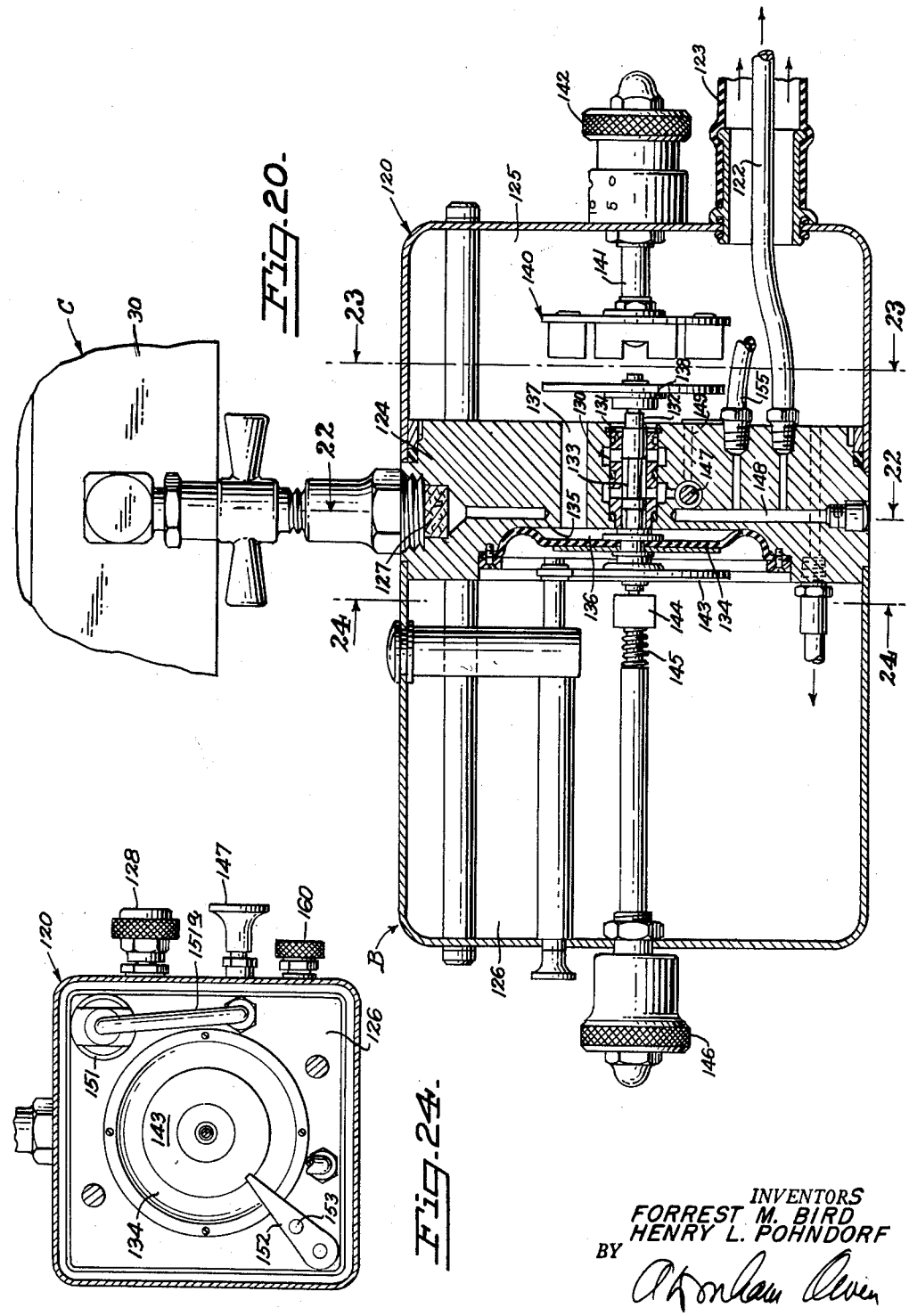

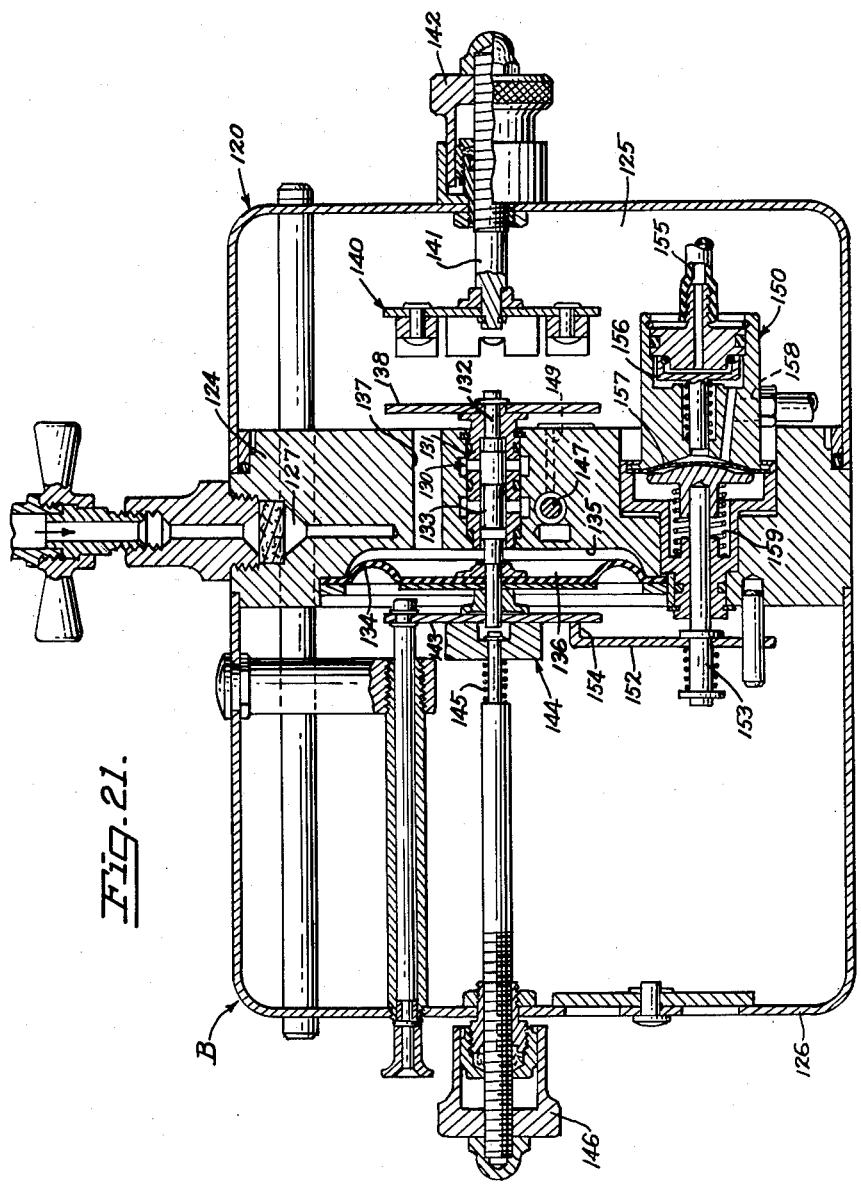

Nov. 10, 1964 F. M. BIRD ETAL 3,156,238
DEVICE FOR AIDING IN THE ADMINISTRATION OF
GASEOUS ANESTHETIC AGENTS
Filed Feb. 18, 1960 13 Sheets-Sheet 12

INVENTORS
FORREST M. BIRD
HENRY L. POHNDORF
BY
ATTORNEY

Nov. 10, 1964   F. M. BIRD ETAL   3,156,238
DEVICE FOR AIDING IN THE ADMINISTRATION OF
GASEOUS ANESTHETIC AGENTS
Filed Feb. 18, 1960   13 Sheets-Sheet 13

INVENTORS
FORREST M. BIRD
HENRY L. POHNDORF
BY

ATTORNEY

United States Patent Office

3,156,238
Patented Nov. 10, 1964

3,156,238
DEVICE FOR AIDING IN THE ADMINISTRATION
OF GASEOUS ANESTHETIC AGENTS
Forrest M. Bird, Airport Box 970, Palm Springs, Calif.,
and Henry L. Pohndorf, 1227 Brewster Drive, El Cerrito, Calif.
Filed Feb. 18, 1960, Ser. No. 9,628
16 Claims. (Cl. 128—29)

This invention relates to a device for aiding in the administration of gaseous anesthetic agents.

The invention enables an anesthesiologist, from his knowledge of cardiopulmonary physiology, to develop whatever respiratory pattern is desired, by varying the inspiratory and expiratory flow rates, the pressures, the sensitivity, and the respiratory timing, so that the smallest infant or the largest adult may be ventilated during anesthesia while assisting or controlling his respiration with precision. In fact, the present invention will ventilate any lung from 1 milliliter to 10 liters capacity with accurate and sharp control.

The automatic ventilation provided by this invention is somewhat like a third hand giving the anesthesiologist more freedom to meet the other needs of the patient and to maintain an accurate chart of the patient's progress. It enables the anesthesiologist to cope with the increased number of monitoring devices now being employed in anesthesia. With more equipment to watch and control, he often finds it difficult to keep close personal contact with the patient. In manual ventilation, the educated hand of the anesthesiologist is able to feel changes in resistance and compliance of airway and lung and thereby to estimate such factors as the depth of the anesthesia and restriction of respiratory exchange by surgical manipulation. When this contact is lost to an automatic ventilator, he must depend on other sources of information. Accordingly, the present invention provides aural and visual signals to enable him to regain this contact.

For example, a feature of the invention is the provision of an indicator for reading the tidal volume or "alveolar air" during each respiration. Also, two pressure indicators read the differences in compliance and resistance changes during pressure- or volume-limiting.

Automatic ventilation is not intended as a complete replacement for manual ventilation by an anesthesiologist; that a rapid, positive push-pull switchover is provided between automatic and manual operation, so that the anesthesiologist can have manual control whenever he desires. In the manual cricuit, an adjustable excess gas leak enables the anesthesiologist to operate it as he will. He is further helped by the fact that the pressures are indicated during manual operation as well as during automatic operation.

The device of this invention may be attached to any gas machine and may be used with any anesthetic gas technique, including closed and semiclosed systems with carbon dioxide absorption, as well as non-rebreathing techniques. It can assist respiration, control respiration, or maintain a minimum control frequency while allowing a spontaneous override by the patient. It can provide a positive pressure as high as +60 centimeters of water and negative pressure as low as 20 centimeters of water below ambient, along with everything in between. Moreover, it can assist respiration during either positive or negative phases. At each pressure setting the flow can be varied, and the device is pressure-limited or volume-limited independent of flow.

An important feature of the invention is that all the mechanisms and procedures are fail-safe, including a novel automatic escape for excess anesthetic gas, a novel relief valve, and a novel automatic flush system. Thus a feature of the invention is that excess anesthetic gases are automatically bled off, whether closed, semi-closed, or non-rebreathing techniques are used. Also, if there is an accidental leak or if an insufficient gas flow depletes the gas supply, the bellows is automatically flushed with emergency refill oxygen.

An important object of the invention is to enable variation of the inspiratory and expiratory flow rates and to control the duration of expiration. For example, a retard control sleeve on the exhalation valve of the respirator controls the expiratory flow rate and pressure.

Another important feature of the invention is its inclusion of a respirator unit. If the patient has any difficulty during anesthesia, the respirator unit can easily be switched to supply him with 40% oxygen or 100% oxygen, as desired. All that need be done is to remove the connection between the anesthesia unit and the respirator unit, and to apply the breathing head assembly of the respirator unit to the patient; this can all be done in a few seconds.

Another important feature of the invention is the simplicity and light weight of the assembly and the availability of its components for cleaning or replacement of parts. Thus, a typical unit weighs only 20 pounds, mounts on a separate stand or attaches to a gas machine or, if desired, can be built into the gas machine. Moreover, the bellows and transparent housing are removable within a few seconds.

Another object of the invention is to make possible the simulation of a cough during anesthesia. This is done by enabling a rapid exchange from a positive phase to a negative phase.

When either humidification or nebulization is desired, it can easily be provided.

Another feature of the invention is the fact that the device is impervious to deterioration by anesthetic gases or vapors. Furthermore, the device provides electrical conductivity between all the parts and their interconnections, thereby eliminating the hazards of static charges building up and sparking in an atmosphere permeated by inflammable anesthetic gas.

Other objects and advantages of the invention will appear from the folowing description of a preferred embodiment.

In the drawings:

FIG. 2 is a view in elevation and partly in section of the assistor-controller unit forming one of the two main elements of the device, shown on a scale enlarged with respect to FIG. 1.

FIG. 3 is a view in elevation and party in section taken at right angles to FIG. 2 and generally along the line 3—3 in FIG. 2. The bellows is shown in its expanded position.

FIG. 4 is a view similiar to FIG. 3 with the bellows shown in a partially collapsed position.

FIG. 5 is a view in elevation of one side of the assistor-controller unit.

FIG. 6 is a view in elevation and partly in section of another side of the same unit.

FIG. 7 is a view in elevation of another side of the same unit.

FIG. 8 is a bottom plan view partly in section, taken along the line 8—8 in FIG. 2 with the bellows and bellows container removed.

FIG. 9 is a bottom plan view with the bellows and bellows-container in place and with the supporting elements shown in solid lines in an outwardly swung position, where the container can be removed or inserted, and shown in broken lines in the normal closed or container-holding position.

FIG. 10 is an enlarged fragmentary view in section taken along the line 10—10 of FIG. 9.

FIG. 11 is a horizontal sectional view taken generally along the line 11—11 in FIG. 3, with the case or hood removed.

FIG. 12 is a view in elevation and in section taken along the line 12—12 in FIG. 2.

FIG. 13 is a fragmentary view in elevation and in section taken along the line 13—13 in FIG. 12.

FIG. 14 is an enlarged fragmentary view in section taken along the line 14—14 in FIG. 12.

FIG. 15 is a view in perspective of the crosshead counterweight and valve shown apart with the valve in its open position.

FIG. 18 is an enlarged view in elevation and in section taken along the line 18—18 in FIG. 11.

FIG. 19 is a further enlarged fragmentary view in section of a portion of the device of FIG. 18.

FIG. 20 is a view in elevation and in section of the respirator of FIG. 1 taken along the line 20—20 in FIGS. 11 and 22.

FIG. 21 is another view in section of the respirator taken along the line 21—21 in FIG. 22.

FIG. 24 is a view in section taken along the line 24—24 in FIG. 20.

Figure 1:
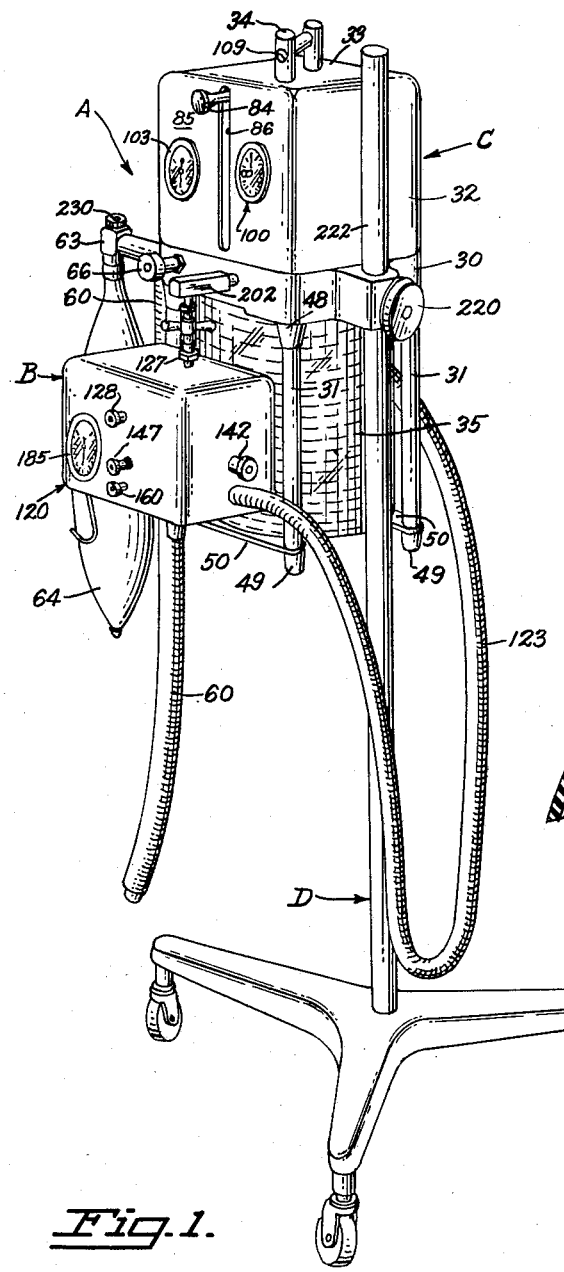
FIG. 1 is a view in perspective of a device embodying the principles of the invention.
Figure 17:
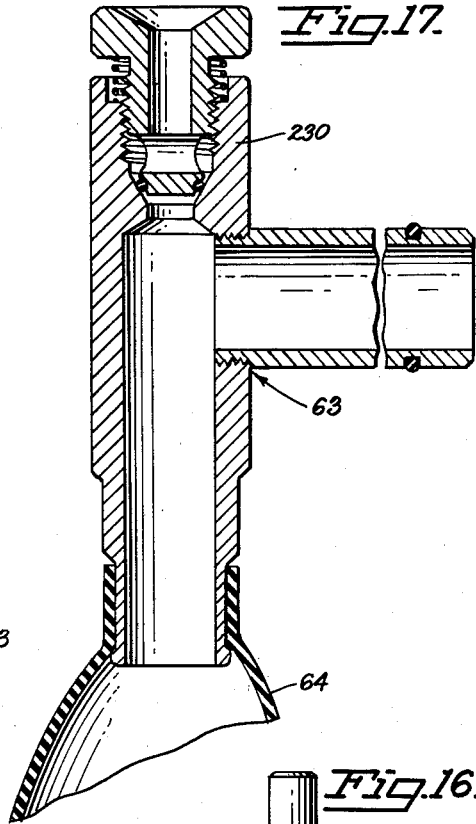
FIG. 17 is an enlarged view in elevation and in section of the valve and fitting to which the bag may be attached for manual operation.

General Description (FIGS. 1–3)

The complete anesthesia respirator A includes two main units, a respirator B, which may (as shown herein) be the device described and claimed in application Serial No. 715,321 filed February 15, 1958, now Patent No. 3,068,856 and an assistor-controller unit C, which forms the principal subject matter of this application. The two units B and C work together and some respirator B is required, whether or not the exact one shown herein is used.

The unit C may be supported on a standard D and may itself support the unit B. In addition, these are: a source E of gas (preferably oxygen) under pressure (see FIG. 2), a source of anesthetic gas F (see FIG. 3), and any desired type of face mask (not shown) or other type of device for dispensing the anesthetic to the patient. Carbon-dioxide absorbers and other such conventional equipment may also be provided.

In basic operation, the breathing of the patient is utilized to actuate the respirator B indirectly, i.e., through a diaphragm or bellows arrangement in the unit C. The patient does not breathe the respirator air or oxygen in this instance but that gas is used to actuate the anesthesia controller unit C to administer the anesthetic gas to the patient.

The Assistor-Controller Unit C (FIGS. 1–19)

The unit C comprises a body 30 having depending legs 31, usually four in number. Its upper end is normally covered by a case or hood 32, whose top wall 33 is provided with a carrying handle 34 that also doubles as a venting device in a manner explained later.

A bellows container 35 depends from the lower end of the body 30 and is enclosed by the legs 31. The container 35 is readily detachable and insertable; it is generally cylindrical and is open at its upper end, where it has a rim 36, and has a single inlet-outlet fitting 37, to which the respirator B is attached in in a manner explained later, so that gas from the respirator B can enter a bellows-enclosing chamber 38. All its walls are imperforate, but they may be, and preferably are, transparent so that operation of its contained bellows 40 may be readily observed.

The bellows 40 is preferably made from conductive rubber (to avoid electrostatic sparks that might set off explosions of flammable anesthetic gas) and is closed at its lower end 41, which is reinforced by a bumper disc 42. At its upper end the bellows 40 has a flange 43 cemented to a supporting metal ring 44. The flange 43 fits between the rim 36 and an annular portion 45 (FIG. 8) of the bottom wall 46 of the body 30, to provide a leak-tight engagement of the bellows 40 with the body 30 and with the container 35, thereby providing an isolated chamber 47 inside the bellows 40 and the isolated chamber 38 outside the bellows 40.

To achieve this leak-tight fit and also to enable easy, foolproof mounting, the legs 31 are utilized. They have frusto-conical upper ends 48 that guide the bellows-container 35 snugly into place opposite the annular portion 45, and they have enlarged feet 49. Two parallel bars 50 are provided, each freely slidably and rotatably mounted at one end on one leg 31 and having an open hook-like engagement 51 with another leg 31; they normally rest or bear on the upper end of the feet 49, but are swingable outwardly for insertion of the container 35 up inside the area bounded by the legs 31. Then the bars 50 are swung back in and hooked in place so that they rest beneath and support the container 35. Screws 52 are provided in the center of each bar 50, and these are used to force the container 35 up until the gasket-like flange 43 of the bellows 40 is firmly sealed between the container 35 and the bottom portion 45.

A passageway 53 (FIG. 11) leads from the bellows chamber 47 through the bottom wall 46 of the body 30 up into a chamber 54 inside the body 30. A snap-in sealing plug 55 normally closes the open end of the chamber 54, which is connected by a valve passage 56 to a central chamber 57. (The plug 55 may be replaced by a nebulizer or humidifier attachment, if desired.) A tank or other source F of anesthetic gas is connected by a conduit 58 to an inlet fitting 59, and a breathing hose 60 goes to the patient (directly or via the circle filter of the anesthesia machine) from an outlet fitting 61, both of which are connected by a short conduit 62 to the central chamber 57. With the passage 56 open, the anesthetic conduit 58 and breathing hose 60 are thus both connected to the bellows chamber 47 for automatic operation, as described below.

The central chamber 57 is also connected by a valve passage 62 to a fitting 63 to which a bag 64 may be connected for manual operation. A valve 65 with a handle 66 provides for switch-over between manual and automatic operation. The valve 65 has a stem 67 carrying two closure spools 68 and 69. For automatic operation, the handle 66 is pushed in, and the spool 69 closes off the passage 62, the passage 56 being open. For manual operation, the valve handle 66 is pulled out, so that the spool 68 closes the passage 56 and the passage 62 is opened. Then, anesthetic gas partially fills the bag 64, and the anesthetist administers the anesthetic gas by spontaneous-, assisted-, or controlled-ventilation techniques.

While automatic operation cannot yet be fully described, this much can be said: when the bellows 40 is being collapsed, it sends the anesthetic gas into the patient's lungs, and the bellows 40 falls or lengthens upon exhalation. It can be made to assist or not assist the patient in either inhalation or exhalation.

In closed system operation, where there is only enough inflow to cover the metabolized oxygen and anesthesia, the expired gases being routed through soda lime or other chemicals and then re-used, the exhaled gas (after purification) goes into the bellows 40 and mixes with the small amount of added gas for inhalation.

For other than closed-system operation, there has to be some escape or venting of the excess gas supply. If the system is completely open, the exhaled gas is not even returned to the bellows 40, never passing back into the hose 60. This system merely calls for a larger supply of gas into the inlet 59. But for semiclosed systems, the device provides for exhalation from the bellows chamber 40 during the exhalation cycle. For this purpose, an excess-exhalation tube 70 (see FIGS. 3 and 4) extends through the body 30 and is slidable with respect thereto. Its lower end is preferably provided with a button, disc, or other enlargement 71, just above which is an inlet opening 72. The reinforced bottom 41 of the bellows 40 engages the button 71 and carries it up when the bellows 40 is being collapsed, the tube 70 sliding freely but without leakage in a guideway 73.

Figure 16:
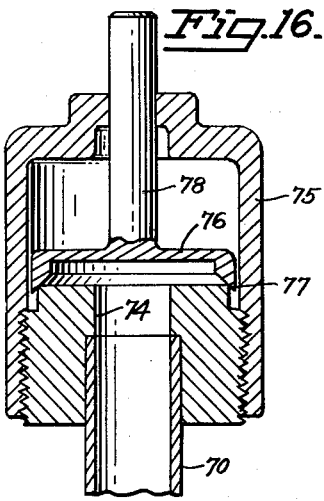
FIG. 16 is an enlarged view in elevation and in section of the valve of FIG. 15 when in its closed position.
Figure 22:
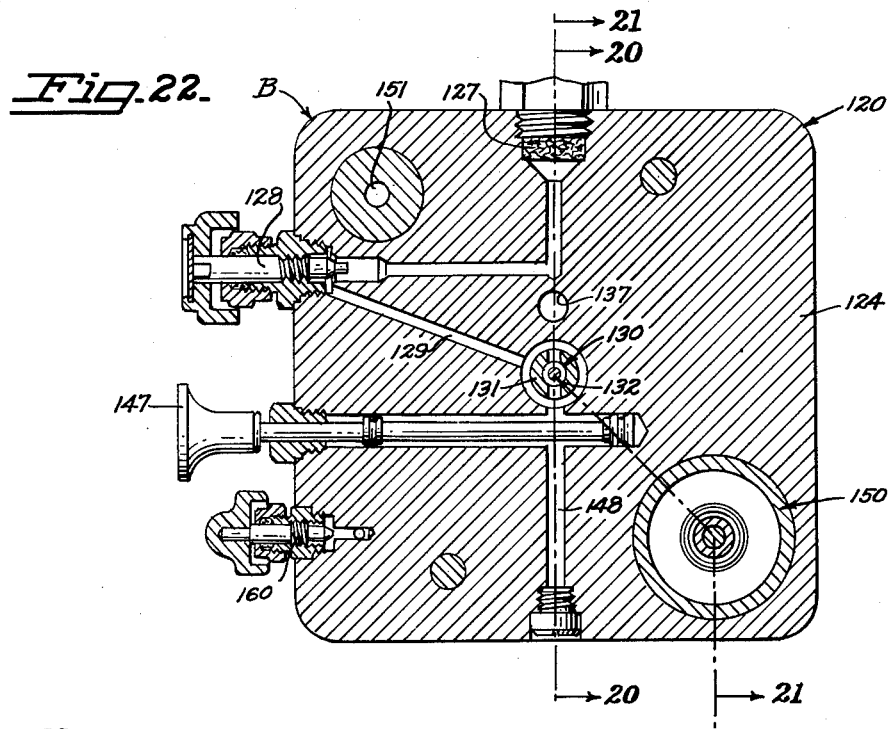
FIG. 22 is a view in vertical section taken along the line 22—22 in FIGS. 11 and 20.
Figure 23:
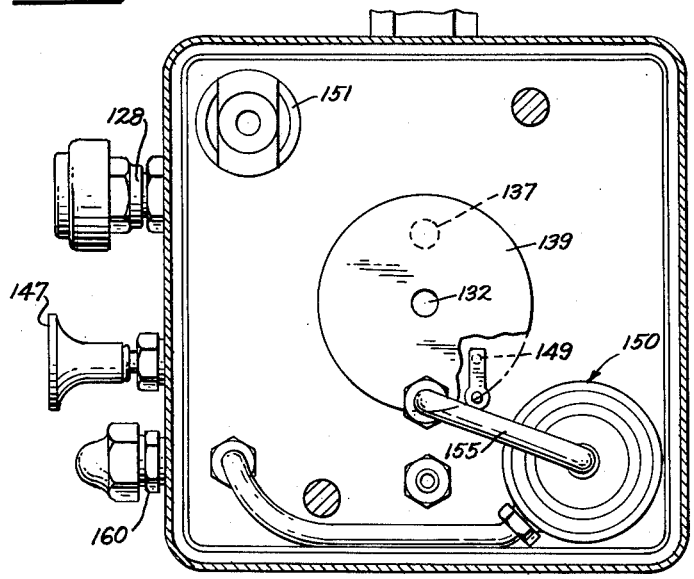
FIG. 23 is a view in elevation and partly in section taken along the line 23—23 in FIG. 20.
Figure 25:
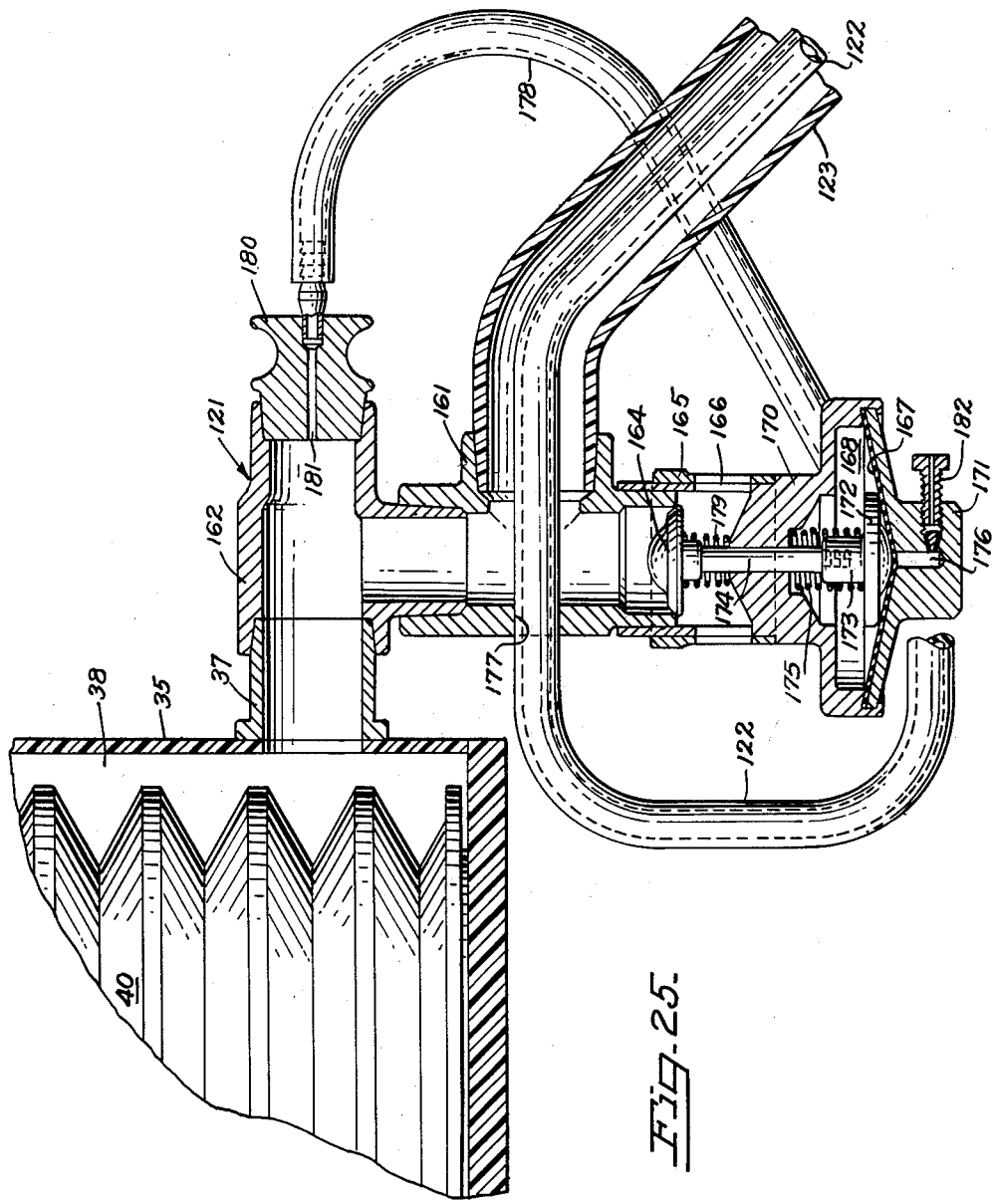
FIG. 25 is an enlarged view in elevation and in section of the exhaust valve and the attachment between the respirator and the bellows container.

The upper end 74 of the tube 70 is open, but a closure valve is provided as shown in FIG. 16, comprising a spider-like housing or guideway 75 and a closure cap or disc 76 (preferably with a downwardly flanged rim 77) has a stem 78 extending up there above that slides in the guideway 75. When the cap 76 covers the upper end 74, no gas is exhausted through the tube 70 from the bellows 40; when it uncovers the end 74, gas is expelled from the bellows chamber 47 through the tube 70. Without internal pressure the weight of the cap 76 and its stem 78 will keep it closed, but under internal pressure greater than atmospheric the cap 76 will be moved up and open the valve as in FIG. 15.

Without further additions, the valve of FIG. 16 would preclude a closed system and limit the flexibility of semi-closed systems, but the invention includes additional equipment that includes refinements adapted for those conditions. Two vertical guide rods 79 extend up from the body 30 on opposite sides of the tube 70, and a weighted crosshead 80 slides up and down on them, bearing on the stem 78 and keeping the cap 76 closed. In effect, as so far described, the weight 80 nullifies the cap 76 and provides a closed system as long as it bears on the stem 78.

However, the invention also provides a stop plate 81 placed transversely on the weighted crosshead 80 (see FIG. 15) so as to limit its vertical movement downward by engaging a lower stop 82. By the limiting of its movement downward, the weight 80 is, in effect, taken off the stem 78 at a certain downward position, and the valve cap 76 is thereafter free to operate to exhaust gas the rest of the way down. This adjustment is obtained by adjusting the vertical position of the lower stop 82, which is for this purpose slidably mounted on a rod 83 (FIG. 2) and set where desired by a set screw 84. The stop 82 engages the stop plate 81 to prevent further downward movement of the weight 80. Thus, when the stop 82 is at the bottom, the device operates as a closed system, and when it is raised the system becomes more and more open. For purposes of convenience, a closed system may be considered as one with gas flow up to 500 ml./min.; above that and up to 4,000 ml./min., the system is considered semi-closed; above that it is open, and indicia may be marked to that effect on the hood 32, on a panel 85 along a slot 86 provided for the set screw 84 (FIG. 5).

When there is engagement preventing further upward movement of the weight 80, further upward movement of the tube 70 is prevented; hence, the bellows 40 can collapse no further. Adjustment of the upper stopping point of the crosshead 80 therefore adjusts the volume of gas administered to the patient on each inhalation. A movable upper stop 87 (FIG. 3) is mounted slidably on a vertical rod 88 with a set screw 89, and again a panel 90 is provided with a slot 91 and indicia for the position of the set screw 89 and therefore of the stop 87. Normally, full flow may be desired, and the stop 87 will then be at the very top. For any volume limitation, there is a proper setting at a lower point.

Movement up and down of the crosshead 80 can be used to show the actual volume inhaled each cycle; that is, the tidal volume or alveolar air; by employing the structure shown in FIGS. 12–15. For this purpose, a projection 92 on the crosshead 80 is connected to an eye 93 on a string cable 94. The cable moves around an upper pulley 95, a lower pulley 96, and an intermediate pulley 97. The pulley 97 is mounted rigidly on a shaft 98 that carries a dial face 99, which is part of a gauge 100 (see FIG. 5). Rotation of the shaft 98 rotates the dial face 99 back and forth relative to a gauge marker 101 and, being properly calibrated in terms of bellows volume, registers the volume of inhalation each breath the patient takes. The gauge 100 may be on the panel 85, and the shaft 98 may also be rotated manually for zeroing it in place, etc., by a knurled extension 102 of the shaft 98.

A pressure gauge 103 may also be mounted on the panel 85 and may be connected by a short conduit 104 to the central chamber 57. This gauge 103 indicates the patient's breathing pressure, which corresponds to the pressure in the chamber 57.

One panel 105 of the hood 32 is provided with a large opening 106 (FIG. 7). Normally the opening 106 is covered by a pivotally mounted perforate disc 107 to permit exhaled gas from the tube 70 to pass out of the hood 32 through openings 108, while helping to exclude dust and prevent tampering. The disc 107 may be swung out of the way, so that one can put his hand into the hood 32 to make or break connections when assembling or disassembling the device. Further exhalation openings 109 are provided through the hollow handle 34, so that the interior of the hood is always at atmospheric pressure.

*The Respirator B (FIGS. 1 and 18–25)*

So far, the description has dealt with the flow and control of the anesthetic gas. It has not yet explained how the bellows 40 is operated by the movement of another gas into and out from the bellows-enclosing chamber 38. In order to explain this critical feature of the device, we must first describe the respirator B. The present description will be brief, for the respirator B is fully described in application Serial No. 715,321, filed February 15, 1958. After that, the portions of the assistor-controller C related directly to the respirator B will be described, for they will then be easier to understand.

The respirator B, as disclosed in application Serial No. 715,321, comprises a control assembly 120 connected to a source of gas (normally oxygen) under pressure and connected to a breathing head assembly 121 by a small conduit 122 and a larger, preferably concentric, conduit 123.

The control assembly 120 comprises a body 124 with a pressure compartment or reservoir 125 and an atmospheric-pressure compartment 126. An inlet 127 leads to a needle valve 128 (FIG. 22) that controls the flow rate of gas in the respirator, so that any desired flow may be obtained over a range greater than from 1 liter per minute to 1,000 l.p.m. From the valve 128 a passage 129 leads to a stem or main valve 130, which together with a sleeve 131 comprises the control flow-switch mechanism. The main valve 130 (FIGS. 20 and 21) is a sliding valve and comprises a sliding shaft member 132 that extends beyond the sleeve 131 at both ends and has a spool-like recess 133.

A diaphragm 134 is mounted with a leak-tight fit on the shaft 132 and is spaced away from a recess 135 in the body 124, to provide a small chamber 136. The chamber 136 is connected to and operationally forms part of the high pressure compartment 125, because a large passage 137 extends through the body 124. The gas in the compartment 125 urges the diaphragm 134 to the left in FIGS. 20 and 21, while the atmospheric pressure in the chamber 126 urges the diaphragm 134 to the right.

On the right end of the shaft 132 (as seen in FIGS. 20 and 21) is mounted an attraction plate or armature 138 made of soft iron or other ferromagnetic metal. A magnet assembly 140 is mounted rigidly to a shaft 141, which extends out of the case and is attached to a handle 142. Since the pressure in the pressure compartment 125 is always (during operation) greater than that in the atmospheric chamber 126, the gas pressure normally tends to force the diaphragm 134 to the left (FIGS. 20 and 21) and therefore to close the valve 130. However, the attraction of the magnet assembly 140 for the attraction plate 138 tends to pull the shaft 132 to the right and open the valve 130. By turning the handle 142, the magnet assembly 140 may be moved nearer to or farther from the plate 138 so as to achieve any desired relation between these opposed forces.

The shaft 132 does not move far between the open and closed positions of the valve 130—usually only about ⅛″ to ¼″—but the peculiar nature of magnetic force provides a snap action like a switch, the force of attraction of the magnet 140 for the plate 138 varying inversely with the third power of the distance between them. If a patient provides the slightest drain of gas from the reservoir, the pressure in the reservoir 125 drops, and even so slight a drop as 0.001 cm. of water can be made to actuate this switch-type valve. Actually, the plate 138 is never permitted to move into contact with the magnets 140, some space always being maintained, but it will be a snap action all the same.

The effect of opening the valve 130 is to send gas under pressure into the reservoir 125. So long as the patent breathes at the flow rate set in the needle valve 128 for that patient, gas continues to flow and the pressure in the reservoir 125 increases. However, when gas pressure builds up in the reservoir 125 to a value that barely overcomes the magnetic force, the shaft 132 is moved to the left. Any movement decreases the magnetic force by the third power of the distance moved; so the action back is also a snap action. Thus, the flow-switch valve 130 is either on or off and is substantially instantaneous. Because of that, the effort to be supplied by the patient can be infinitesimal and the timing rate can be very rapid—as much as or more than 500 cycles per minute. And (as later explained), the patient effort required to switch the respirator B on can be increased when the patient is able to exercise his own respiratory muscles to give him exactly the amount of help he needs and no more and no less.

The valve 130 is both flow-sensitive and pressure-sensitive, for either an increase in pressure in the compartment 125 or a stoppage or reduction of flow (which results in increased pressure on the diaphragm 134) will turn the valve off. Moving the handle 142 increases or decreases the top breathing pressure at which the valve 130 moves to its off position.

The shaft 132 is provided at its left end with an armature or attraction plate 143 of the same general type as the plate 138, and a sensitivity magnet assembly 144 is provided in the compartment 126, acting on the attraction plate or armature 143, the magnet being cushioned by a spring 145. The magnet 144 may be identical in size, shape, and attraction to any one of the several magnets of the assembly 140; so the force ratio between the four-magnet assembly 140 and the one-magnet assembly 144, as shown, is four to one (although this is not critical). A handle 146 gives the needed control for moving the magnet 144 closer to or farther away from the armature 143. So operation is substantially like that of the magnet assembly 140, except that the assembly 144 exerts only one-quarter the force (or some other ratio, if desired).

When the magnet 144 is close to the armature 143, it takes much more effort on the part of the person breathing to move the valve 130 to its "on" position than when the magnet 144 is distant from the armature 143. So the sensitivity assembly determines the patient effort. For example, in one embodiment, it was found that when the magnet 144 was in its innermost position (actual contact is never made) the patient effort was about 3 cm. of water below ambient atmospheric pressure. When the magnet 144 is withdrawn to a certain location, easily found, a zero point is reached where it requires no patient sucking effort to turn the valve 130 on. From this point in is the *sensitivity control range* where any desired amount of patient effort from zero up to the maximum (as 3 cm. or more) can be obtained.

From the zero point out, the magnet assembly 144 functions as a *magnetic timer*. A magnetic pull is still exerted on the armature 143, and the pull is sufficient to delay the automatic opening of the valve 130 by magnetic assembly 140 for a finite time. The time decreases as the magnet 144 is moved farther and farther away from the armature 143.

Under sensitivity control the patient actuates the valve 130 by his own respiratory rate at all times and at the effort appropriate to him. Even when the switch valve 130 is timed automatically, the patient may still have some control. For example, if it is set for ten times per minute, the patient will still be able to switch the valve 130 on so long as his own breathing rate is faster than 10 times per minute, while if he falls below that level, the valve 130 times the patient. This flexibility is noteworthy. The timing speed may vary over a very wide range, between less than one cycle per hour and more than 500 cycles per minute. The patient effort may really be minimal. At some settings of the magnetic assembly 144 a movement of the tongue or a flexure of the cheeks is enough to switch the respirator on.

So far the flow into the valve 130 and the operation and control of the valve 130 have been explained. When the valve 130 is in its closed position, the flow is cut off. When the valve 130 is open, the compressed gas flows to a gas switch valve 147.

In both of the two positions of the gas switch 147, the gas (normally pure oxygen) flows by passageway 148 into the inner conduit 122 which leads to the breather head assembly 121. Pure oxygen also passes from the passageway to an air timing unit 150.

When the gas switch 147 is pushed in and when the valve 130 is open, pure oxygen passes by a passage 149 into and fills the reservoir 125. From the reservoir 125 it passes freely into the large conduit 123 and to the breather head assembly 121. The reservoir 125 not only functions as a pressure chamber for the diaphragm 134 but also retains a supply of gas that can supply the instant peak demand of a patient as soon as he breathes and makes it possible to have a relatively low constant flow rate through the needle valve 128.

When the switch 147 is pulled out, the oxygen flows (as shown in Serial No. 715,321) via a venturi 151 (FIG. 24) where the oxygen is mixed with atmospheric air from the chamber 126 and then sent into the pressure compartment 125. The purpose of the venturi 151 is to dilute the oxygen with air. Since air is approximately 20% oxygen, it can be enriched to supply 33⅓% oxygen by mixing one part of pure oxygen with five parts of atmospheric air.

The pneumatic timer 150 (which may also be termed an automatic timer, breathing rate control, or secondary timer) is provided primarily for these anesthesia applications. Very precise timing is achieved by timer 150. A spring-mounted arm 152 in the chamber 126 is mounted on a shaft 153 so that the arm 152 is parallel to the attraction plate 143, and the shaft 153 is parallel to the valve shaft 132. An axially turned end 154 of the arm 152 is so arranged that it can strike the plate 143. If it does so, the little tap it gives is sufficient to start the shaft 132 moving to the right, and once that happens, magnetic attraction, varying as it does inversely with the third power of the distance, will snap the valve 130 open. The pneumatic timer 150 acts by moving the arm 152 to the right at the desired time.

Oxygen coming from the passage 148 via a conduit 155 forces a spring-mounted plunger 156 away from its seat and pressurizes a spring-biased diaphragm 157. A passage 158, however, leads to a needle valve 160. By controlling the bleed rate at the needle valve 160, the recovery of the diaphragm 157 by its spring 159 is controlled, and the time it takes to bleed off the gas, forcing the diaphragm 157 to the left, is the maximum time that the valve 130 will remain off. It can, of course, be actuated more quickly by the patient's exerting whatever effort is then required to time the valve 130 himself. But if he does not breathe before the automatic timer 150 acts, it will time his breathing for him.

This timer 150 does not, thus, ordinarily take the timing away from the patient, but it will do so if he does not breathe at the correct time. Note also that the timing begins at the end of inspiration; so long as the patient is breathing in, the timing will not begin. It provides a floor, an insurance, to end the exhalation time and pause.

This timer 150 serves to send gas (in this instance from the bellows chamber 47) into the patient's lungs if he does not take it up within a certain time determined by the bleed-off, but if he does take in air independently, then it will not affect him, and he will be on his own. He is given reserve support but is not given a push.

The large conduit 123 conducts the main current of oxygen or oxygen-enriched air from the control assembly 120 to the breather head assembly 121 (FIG. 24). More specifically, it conducts gas from the reservoir 125 to a lower T 161, to which is secured an upper T 162. From there the gas ordinarily passes through a left branch 163 to a mouthpiece or face mask, but in this application the left branch 163 is connected directly to the inlet fitting 37 of the bellows container 35.

A spring-mounted exhalation valve 164 of the mushroom type is normally held seated against the lower T 161, but exhalation forces the valve 164 open. The mean positive exhalation pressure may be adjusted by rotating a perforated retarder sleeve 165 to vary the size of the outlet opening provided by registration or partial covering of T openings 166. The retarder 165 may easily be adjusted to secure the exact exhalation rate desired.

A diaphragm 167 closes a chamber 168 at the lower end of a body 170, to which the outer periphery of the diaphragm 167 is clamped by a cap 171. A diaphragm plate 172 secured to the lower end of a stem 173 which forms a lost-motion connection with a stem 174 of the valve 164 is urged downwardly thereagainst by a spring 175, but a small chamber 176 is formed in the cap 171 on its side of the diaphragm 167.

The small conduit 122 passes through an opening 177 in the lower T 161 and leads directly into the chamber 176. So the gas in the small conduit 122 builds up pressure in the small chamber 176 during inhalation to push the diaphragm 167 up into engagement with stem 173 and thereby helps keep the valve 164 closed even while the pressure in the T 161 is increased by the flow of gas under pressure. Without such a pressure operation, the increased pressure would overcome the spring 179 and open the valve, but this cannot happen because of the pressure bias. A conduit 178 normally leads from the chamber 176 to a nebulizer, but in this instance no nebulizer is used here, being replaced by a plug 180 with an opening 181 to which the conduit 178 is connected. A needle valve 182 controls the bleed rate from the chamber 176, as explained in Serial No. 715,321.

*Connection of the Units B and C and Related Parts in the Unit C (FIGS. 1, 2 11 and 24)*

A source E of oxygen (or in some cases, but less preferably, air) under pressure is connected by a conduit 199 to an inlet fitting 200 that is attached to the body 30. Thence, it passes via a conduit 201 (FIG. 11) passing to an outlet fitting 202 on the other side of the body 30, where the inlet 127 for the unit B is attached.

Thus, when the units B and C are connected, the general effect is the same as though the patient were breathing through the assembly 121 and exhaling through the valve 164 *except* that the bellows 40 separates him from the gas in the unit B, so that he actually *breathes* the gas in the bellows chamber 47. In other words, actuation is accomplished by the unit B, and the bellows 40 acts generally like a diaphragm connection to the unit B, preserving operation but separating the actual gas breathed from the gas in the unit B.

*Oxygen Flushing (FIGS. 2, 3, 11, 18 and 19)*

If the bellows 40 were fully collapsed and the patient needed more gas to breathe, more oxygen, he could not get it from the bellows chamber 47, this being closed operation. Consequently, another innovation is provided. There are two T's 204 and 205 in the conduit 201 (see FIG. 18). The T 204 leads to a short vertical conduit 206 on which is mounted a diaphragm-operated valve 207, which normally closes off passage between the conduit 206 and a conduit 208 that leads into the bellows chamber 47 through an opening 209 (FIG. 8).

The second T 205 leads up to a mechanically operated normally closed valve 210, from which a conduit 211 leads to a diaphragm chamber 212 on the opposite side of a diaphragm 213 from the conduit 206. When the valve 210 is opened, gas from the conduit 201 and T 205 flows through the valve 210 and conduit 211 into the chamber 212 and actuates the diaphragm 213 to open the valve 207 and thereby send oxygen to the patient via the conduit 208 and the bellows chamber 47.

The valve 210 is at the top of a tubular standard 215 and is actuated by a lever 217 upon engagement of the lever 217 by the crosshead 80. Thus, when the crosshead 80 reaches the top, indicating collapse of the bellows 40, the valve 210 is actuated and therefore the valve 207 is actuated, sending oxygen into the bellows chamber 47. An adjustable bleed valve and orifice 218 times the open phase of the valve 207 so that just the right amount of oxygen fills the bellows 40. The valve 210 closes as soon as the bellows 40 and the crosshead 80 descend, by virtue of a spring 219 around the stem 216 in the valve 210, and the bleed orifice 218 is provided to bleed out the chamber 212 at the right speed (to allow filling time) and then the valve 207 is returned closed by its springs to terminate refill.

*Assembly and Operation Procedure*

The unit C is attached to its stand D by turning a handle 220 that tightens a clamp 221 on the upright rod 222 of the stand D, or the unit C is mounted vertically on a gas machine. The thumb screws 52 are tightened so that the transparent housing 35 compresses and seals against the upper flange 43 of the bellows 40 and seals that flange to the body 30. The inlet 127 of the respirator B is attached to the threaded outlet fitting 202, and the breathing assembly 121 is connected to the inlet fitting 37 on the housing 35, the opening 37 earlier having been placed in whatever quadrant is most convenient. At the same time, the plug fitting 180 is substituted for the nebulizer at the T 162, and the small line 178 is inserted into the plug 180. The rapid-opening needle 182 is preferably closed and the retard sleeve 165 is opened.

Now, the incoming oxygen supply line 199, usually at 40 to 60 p.s.i., is attached to an oxygen supply valve 225 at the inlet fitting 200 and the valve 225 is fully opened. After checking the operating pressure on an oxygen supply gauge 226 (connected by a conduit 227 to the conduit 201) the oxygen circuit is ready to operate.

To initiate operation, it is usually preferable to pull the switchover valve 66 out to the manual position, so that anesthesia will initially be supplied by the bag 64 rather than by the bellows 40. The volume-limit screw 89 is set in the normal position at the top (see FIG. 6) and the excess-gas-leak screw 84 is set to provide the needed leak for the volume to be delivered from the gas machine. This setting automatically gives a convenient negative range.

The anesthesia-gas enters from inlet hose 58 and passes to the patient through the delivery hose 60. It also passes to the bag 64. A manual excess gas leak valve 230, above the bag 64, is first closed to help in choosing the size of breathing bag to be fitted and is then opened sufficiently to provide the desired gas leak. The manual breathing bag system for induction may now be used with a customary anesthetic technique, by squeezing and releasing the bag 64.

If assisted or controlled respiration is to be used, the patient breathing pressure is noted on the gauge 103. On the respirator B the pressure control is normally adjusted to within the range of 10 to 15 cm. of water. The air-mix valve 147 on the respirator is preferably pulled out to provide operating economy in driving the bellows 40, by using the venturi 151 to mix air with the pure oxygen, and the auto-timer 150 is normally turned off initially. The sensitivity is set by the handle 146, the hand timer 142 pushed in, and the flow rate control 128 is opened slowly until the respirator B just switches off.

To "assist" the patient, the switchover valve 65 is pushed in to its automatic position and the hand timer handle 142 on the respirator B is pushed in. If the inspiratory effort is very weak, higher sensitivity is provided by adjusting the sensitivity magnet 144 to pick up weaker respiratory signals. This is done by turning the sensitivity control handle 146 until each inspiratory effort switches the respirator B on. For "assistance" the magnet 144 should not be retracted too far, or the patient will be "controlled." If the patient does not switch the respirator B on, he is apneic, paralyzed by relaxants or deeply anesthetized. In that case, the auto timer 150 is set at a minimum control rate. The chest excursion should be monitored by observing the gauge 100 and setting the flow rate valve 128 accordingly.

For "controlling" the patient, the auto-timer 150 is opened slowly until the desired expiratory phase duration is obtained, allowing the patient adequate time to exhale. Then, with the bag switchover valve 65 in its automatic position, the chest excursion is again monitored in a manner similar to that used when "assisting."

*Additional Operational Features*

If the patient is breathing spontaneously, and anesthetic agents are in normal concentration, the unit A easily maintains satisfactory assisted respiration at that level of anesthesia. The patient breathing pressure, (as shown on the gauge 103) plus the pressure needed to lift the bellows 40 (usually 4 cm. of water) equals the pressure shown on the gauge 185 of the respirator B. If the bellows 40 is loaded with additional weight, the pressure difference will be proportionately greater. The patient breathing pressure during automatic assist will be less than on manual assist. This slightly lower breathing pressure will provide the same tidal volume as that obtained by manual means, because of a more laminar air flow.

At each pressure, the maximum lung filling results from the lower inspiratory flow-rate range, because the inspiratory filling time is increased, giving an increase in alveolar air. The flow rate is kept below this range to keep the respirator B on. This feature holds the lung inflated, if desired, at any pressure under the peak inspiratory pressure setting. For instance, during open chest the lung may be held smoothly inflated, up to any peak inspiratory pressure setting previously selected, by closing the flow rate and then slowly opening it until the desired pressure is held in the lung. Then, to deflate the lung, the inspiratory flow rate may be increased to switch the respirator B off. Conversely, a higher inspiratory flow-rate range decreases the filling time and therefore decreases—alveolar air.

If by slowing the inspiratory flow rate the desired chest excursion is obtained, but the inspiratory filling time is too long, the inspiratory flow rate and the breathing pressure may both be increased until the desired chest excursion is obtained, and the desired inspiratory filling time results.

During assisted respiration, the breathing rate may be slowed or increased by controlling alveolar air. To reduce the breathing rate, the inspiratory flow rate may be lowered. This increases alveolar ventilation, lowers carbon dioxide accumulation, and reduces the respiratory rate. To increase the breathing rate, the inspiratory flow rate is increased; this decreases alveolar ventilation, allows carbon dioxide to build up, and increases the respiratory rate.

When assisting, the patient's inspiratory effort can be detected by the flick of the hand of the patient-breathing pressure gauge 103, when the sensitivity setting of the magnet 144 is correct. Higher sensitivity may result in a controlled respiration and hyper-ventilation apnea. In that event, the control may be tripped by the first heartbeat impulse to arrive during the expiratory pause.

By setting the excess-gas-leak control handle 84 at the level where the total anesthetic gas flow is properly matched, the bellows 40 will not hit the bottom of the transparent housing 35 at the end of expiration, and will maintain a slight negative pressure of about two to three centimeters of water (or more if additional weight is added to the bellows 40). This facilitates expiratory flow by creating a small pressure gradient that overcomes expiratory resistance in the anesthesia circuit. If it is desired to hold a slight positive pressure during expiration, the control 84 is moved to its bottom position.

During closed techniques, if the total anesthesia gas flow into the bellows 40 is not sufficient to cover inspiratory leaks, the bellows 40 will gradually collapse because of an insufficient amount of gas in the circuit. If the bellows 40 becomes empty and hits the top, an automatic flush occurs due to tripping of the lever 217 and actuation of the valves 207 and 210, and the bellows 40 is re-filled with 100% oxygen. This condition may be changed by stopping the leak or increasing the anesthetic-gas flow. A total anesthetic-gas flow sufficient to keep the circuit filled during spontaneous respiration often will not cover inspiratory-phase pressure leaks, as when the inspiratory pressure is increased or prolonged during manual or automatic ventilation.

If a relaxant is used and respiration is depressed, the patient is easily controlled by opening the auto-timer 150 and then decreasing it until the desired expiratory-phase duration is obtained. The inspiratory filling time and tidal air are controlled by both the pressure control and the inspiratory flow rate control 128, and the expiratory time is controlled by the auto-timer 150. The more the auto-timer 150 is opened, the shorter the expiratory time. This is a sensitive control and should be adjusted slowly.

By pushing the hand timer 142 in, a respiration can always be started. Similarly, by pulling it out, a respiration can always be stopped. Independent control over both inspiratory and expiratory phases allows any ratio to be established. In the adult a breathing rate of about twelve to fourteen per minute has been found adequate. Tidal air of about twenty percent above normal gives excellent alveolar air exchange. A normal inspiratory filling rate with an expiratory time twice the inspiratory, allows good circulatory compensation for right heart filling. The ability to carry a minimum "control" and to allow a spontaneous override is useful to minimize hyperventilation.

When the procedure is terminating, and it is desired to get the patient back on "assist," the breathing rate may be decreased by regulating the auto-timer 150 to about eight breathing cycles a minute and the tidal air may be slightly decreased by increasing the inspiratory flow-rate by the control 128. This will maintain minimal ventilation and prevent excessive build-up of carbon dioxide.

The Volume Limit Technique

If it is desired to use the volume-limited technique, the device is re-adjusted to closed-circuit operation, the anesthetic gas flow is changed as required, and the excess gas leak control 84 is moved to its closed circuit position near the bottom. Then the volume limit stop 89 is moved down to give a desired tidal volume. Next, the upper pressure limit is established by increasing positive pressure on the respirator B. If this pressure is reached before the desired volume is delivered, the respirator B will switch off. 30 cm. of water is suggested as a peak pressure for normal procedures. A compensatory increase is made in the inspiratory flow-rate by the needle valve 128, and the sensitivity control 142 is re-set as required. The volume is then read on the gauge 100 and the chest excursion is monitored as before to obtain a final volume-limit setting. With this technique the circuit is kept free of leaks, so that the total volume indicated by the gauge 103 is delivered to the patient.

Conditions of increased resistance and decreased compliance are detected by observing the patient breathing pressure on the gauge 103 at the start of procedure. If this pressure increases as the procedure progresses, the patient's resistance is rising and/or the lung is becoming less compliant. If this pressure decreases, the opposite obtains. Increases in this indicated delivery pressure give almost quantitative measures of these deleterious factors.

Expiratory flows may be retarded by partially closing the exhalation orifice, using the retard sleeve 165 for this purpose, rotating it to achieve desired orifice size and flow.

An interesting feature of this invention is that the respirator B may be used by itself to ventilate the patient pre-operatively and post-operatively with oxygen or an oxygen-air mixture, while the units A and B are used together during the operation.

The device of this invention gives quite different results from prior-art devices in which pop-off valves bled excess gas at or near a peak pressure limit that necessarily occurred near the end of inspiration. By adjusting the stops for the valve of this invention, excess gas entering at various flow rates is automatically expelled, so that the gas volumes are automatically adjusted at the beginning of each inspiratory phase. Moreover, by controlling the height of the bellows at the end of inspiration, the free-fall of the bellows gives a constant negative pressure, a mean negative flow gradient being exerted on the lungs during expiration, no matter how much gas enters the bellows 40. The bleed valve 77 also regulates the total gas volume under variable conditions of leakage from the circuit, such as may be caused by a leaky face mask.

This same mechanism enables a biphasic inspiratory pattern, as follows: during semi-closed or open operation, as the bellows 40 ascends, the automatic equilibrating valve 77 opens at a pressure of about one-half centimeter of water, and when valve 77 is closed by engaging the counterweight 80 the pressures gradually increase, slightly lengthening the bronchi of the lung, increasing the internal diameters of the airways to an optimum size that enables efficient, rapid filling of the air sacs of the lung. This operation gives an increased tidal exchange at a lower mean pressure and is considered to be more physiological and less embarrassing to cardiac output than is an abrupt change of pressures.

The stop 82 may be set to control the lowest point that the bellows bottom 41 can reach. By keeping the bottom 41 from ever coming into actual contact with the bottom of the housing 35, the device prevents the creation of a positive expiratory pressure, said to be detrimental to cardiac output. This also means that a constant mean expiratory pressure gradient is applied to the lung during the entire expiratory period, even though the gas flow is as high as fifteen liters per cycle.

The gauge 100 may be used as a spirometer, because it is connected to the counterweight 80 and therefore never indicates the leaked gas passing out when the valve 77 is unseated.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

What is claimed is:

1. A device for use with a respirator for administering anesthetic gas, including in combination: a body member having an upper side and a lower side and defining a hollow chamber having an inlet for anesthetic gas, an outlet for said gas, and a bellows outlet opening through said lower side; a bellows having a centrally open upper fixed end closed against said lower side of said body and a reinforced lower movable end, the interior of said bellows and said lower side defining a variable capacity chamber connected to said hollow chamber by said bellows outlet opening; a bellows housing enclosing said bellows and sealed against its upper end and sealing it to said lower side to define a bellows-enclosing chamber, the pressure in said bellows-enclosing chamber having an actuating effect on said bellows, said bellows housing having an inlet opening adapted to be connected to a respirator for varying the pressure in said bellows-enclosing chamber; an exhaust tube slidably mounted in said body and extending through said body and into said bellows and normally urged downwardly by gravity with its lower end in contact with said reinforced lower end of said bellows and moved up thereby when said bellows is collapsed by the pressure in said bellows-enclosing chamber being greater than that in said bellows interior, said tube having opening means adjacent its lower end and an open upper end; a gas leak valve normally closing the upper end of said tube but mounted for vertical sliding action away therefrom, said valve having an upwardly extending stem; a pair of vertical rods extending up from said body on opposite sides of said tube; a crosshead slidably mounted on said rods and normally bearing on said gas leak valve stem to hold said exhaust valve closed; and movable upward and lower stop means for said crosshead, movably supported by said body.

2. The device of claim 1 having a gauge with an indicator connected to said crosshead and moved by it and a dial calibrated in terms of gas volume to indicate the amount of gas breathed by the patient each cycle.

3. A device used in connection with a respirator for administering anesthetic gas, including in combination: a body member having a hollow interior defining a first anesthetic gas chamber with a gas inlet and a gas outlet; a vertically mounted bellows having a fixed upper end and a reinforced movable lower end, the interior of said bellows defining a variable capacity chamber connected to said first chamber; a bellows housing enclosing said bellows and having an inlet adapted for connection with a respirator to vary the pressure in said housing, so that the pressure in said housing acts on said bellows to vary the size of said variable capacity chamber; an exhaust tube slidably mounted in said body and extending through said body and down into the interior of said bellows, with a lower end in contact with said reinforced movable end of said bellows and moved when said bellows opens and collapses, and having an upper end, said tube having opening means adjacent each end; a slidable exhaust valve for said upper end of said tube; weight means normally bearing on said exhaust valve stem and moving with it in a lost-motion connection to hold said exhaust valve closed; and means for stopping said weight means while said valve moves further.

4. A device for use with a respirator for administering anesthetic gas, including in combination: a body member having a hollow interior defining a central chamber with an inlet and an outlet, a first side chamber connected by first passage means to said central chamber and having a bellows outlet opening, and a second side chamber connected by second passage means to said central chamber and having a bag outlet opening; a valve having a stem and two closure spools, said valve being movable in said passage means between a first position where it opens said first passage means and closes said second passage means and a second position where it closes said first passage means and opens said second passage means; a first gas leak valve at said bag outlet opening adjustable to vary the leakage therethrough to the atmosphere; a vertically mounted bellows having a centrally open fixed upper end closed against said body and a reinforced movable lower end, the interior of said bellows defining a variable capacity chamber connected to said first side chamber by said bellows outlet opening; a bellows housing enclosing said bellows and sealed against its fixed end to define a bellows-enclosing chamber, said housing having means adapted for connection to a respirator for varying the pressure in said bellows-enclosing chamber; an exhaust tube slidably mounted vertically in said body and extending through said body and down into the interior of said bellows, with a lower end in contact with said reinforced movable end of said bellows and moved when said bellows opens and collapses, and having an upper end, said tube having opening means adjacent each end; a slidable second gas leak valve normally closing said upper end of said tube; weight means normally bearing on said second gas leak valve stem and moving with it in a lost-motion connection to hold said exhaust valve closed; and means for stopping said weight means while said second gas leak valve moves further down to enable opening of said second gas leak valve by pressure inside said bellows.

5. A device for use with a respirator in administrating anesthetic gas, including in combination: a body member having a hollow interior defining a central chamber with an inlet and an outlet, a first side chamber connected by first passage means to said central chamber and having a bellows outlet opening, and a second side chamber connected by second passage means to said central chamber and having a bag outlet opening; a valve having a stem and two closure spools, said valve being movable in said passage means between a first position where it opens said first passage means and closes said second passage means and a second position where it closes said first passage means and opens said second passage means; a gas leak valve at said bag outlet opening adjustable to vary the leakage therethrough to the atmosphere; a bellows having a centrally open fixed end closed against said body and a reinforced movable end, the interior of said bellows defining a variable capacity chamber connected to said first side chamber by said bellows outlet opening; a bellows housing enclosing said bellows and sealed against its fixed end to define a bellows-enclosing chamber the pressure in which controls the action of said bellows, said bellows-enclosing chamber being adapted for connection to a respirator for varying the pressure in said bellows-enclosing chamber.

6. The device of claim 5 wherein said first side chamber has also an inlet means for connection of a nebulizer thereto.

7. A device for use with a respirator in administering anesthetic gas, including in combination: a body member having a conduit for said gas with an inlet and an outlet and passage means, said body also having a lower side and an upper side and four depending legs extending down from said lower side; a vertically mounted bellows having an open upper flanged end and a reinforced lower movable end, the interior of said bellows defining variable capacity chamber connected to said conduit by said passage means; a bellows housing enclosing said bellows and sealed against its said upper flanged end to define a bellows-enclosing chamber, the pressure in which actuates said bellows, said bellows housing having an inlet adapted for connection with a respirator to vary the pressure in said bellows-enclosing chamber; two parallel bars, each having one end freely slidably and rotatably mounted on one said leg and another end having a hook-like engagement for another said leg, said bars when engaging two said legs each, fitting beneath said bellows housing and retaining it in place; and means on said bars for forcing said housing upwardly against said flanged end of said bellows to seal said flanged end to the lower side of said body, said bars when swung out of engagement with said bellows housing enabling withdrawal of said housing and said bellows.

8. The device of claim 7, wherein said body member's lower side has an annular recess for said flanged end and wherein the upper ends of said legs adjacent said lower side are tapered to guide said housing into exactly the right position against said flanged end.

9. A device for use with a respirator in administering anesthetic gas, including in combination: a body member having a first conduit for oxygen with an inlet, an outlet for connection to a respirator inlet, and first and second branch openings and a second conduit for anesthetic gas with an inlet and an outlet and passage means, said body also having a lower side and an upper side; a bellows having a centrally open upper fixed end closed against said lower side of said body and a reinforced lower movable end, the interior of said bellows defining a variable capacity chamber connected to said second conduit by said passage means; a bellows housing enclosing said bellows and sealed against its upper end to define a bellows-enclosing chamber the pressure in which actuates said bellows, said bellows housing having an inlet for connection to a respirator outlet to vary the pressure in said bellows-enclosing chamber; an exhaust tube slidably mounted in said body and extending above and below said body normally urged downwardly by gravity with its lower end in contact with said reinforced bellows lower end and moved up when said bellows is collapsed, said tube having opening means adjacent its lower end and an open upper end; a gas leak valve normally closing the upper end of said tube but mounted for vertical sliding action away therefrom, said valve having an upwardly extending stem; lost-motion means for normally closing said gas leak valve; stop means for said lost-motion means; a normally closed flush valve connected to said first-branch opening and with an outlet connected to the interior of said bellows; a normally closed actuator valve connected to said second branch opening and to said flush valve for opening said flush valve when said actuator valve is opened; and mechanical means for opening said actuator valve when said bellows is collapsed.

10. A device for use with a respirator for administering anesthetic gas, including in combination: a body member having an upper side, a lower side, a first conduit for oxygen with an inlet, an outlet for connection to a respirator inlet, and first and second branch openings, and a second conduit defining three chambers, a central one having an inlet for anesthetic gas and an outlet for said gas, a first side chamber connected by first passage means to said central chamber and having a bellows outlet opening through said lower side, and a second side chamber connected by second passage means to said central chamber and having a bag outlet opening; a switchover valve having a stem and two closure spools, said valve being movable in said passage means between a first position where it opens said first passage means and closes said second passage means and a second position where it closes said first passage means and opens said second passage means; a gas-leak valve at said bag outlet opening adjustable to vary the leakage therethrough to the atmosphere; a bag secured to said bag outlet opening; a bellows having a centrally open upper fixed end closed against said lower side of said body member and a reinforced movable lower end, the interior of said bellows and said lower side defining a variable capacity chamber connected to said first side chamber by said bellows outlet opening; a bellows housing enclosing said bellows and sealed against its upper end to define a bellows enclosing chamber, said bellows housing having an inlet opening connected to a respirator outlet for varying the pressure in said bellows-enclosing chamber; and exhaust tube slidably mounted in said body and extending through said body and normally urged downwardly by gravity with its lower end in contact with said reinforced lower end of said bellows and moved up thereby when said bellows is collapsed by the pressure in said bellows-enclosing chamber being greater than that in said bellows interior, said tube having opening means adjacent its lower end and an open upper end; a second gas leak valve normally closing the upper end of said tube but mounted for vertical sliding action away therefrom, said valve having an upwardly extending stem; a pair of vertical rods extending up from said body on opposite sides of said tube; a crosshead slidably mounted on said rods and normally bearing on said exhaust valve stem to hold said second gas leak valve closed; upper and lower stop means for said crosshead, supported by said body; a normally closed diaphragm-operated flush valve connected to said first branch opening and with an outlet connected to the interior of said bellows; a normally closed actuator valve connected to said second branch opening and to said flush valve for opening said flush valve when said actuator valve is opened; and mechanical trip means for opening said actuator valve, said trip means being mounted for engagement by said crosshead at an upper position thereof corresponding to a collapsed position of said bellows.

11. A device for use with a respirator administering anesthetic gas, including in combination: a body member having a first main conduit for oxygen with an inlet and an outlet for connection with said respirator, first and second branch conduits connected to said first main conduit, and a second main conduit for anesthetic gas with an inlet and an outlet and passage means, said body also having a lower side and an upper side; a bellows having a centrally open upper fixed end closed against said lower side of said body and a movable lower end, the interior of said bellows defining a variable capacity chamber connected to said second main conduit by said passage means; a bellows housing enclosing said bellows and sealed against its upper end to define a bellows-enclosing chamber, said bellows housing having an inlet for connection to a respirator for varying the pressure in said housing so as to actuate said bellows; a normally closed flush valve connected to said first branch conduit and with an outlet connected to the interior of said bellows; a normally closed actuator valve connected to said second branch conduit and to said flush valve for opening said flush valve when said actuator valve is opened; and mechanical means for opening said actuator valve when said bellows is collapsed.

12. A device for administering anesthetic gas largely in accordance with the patient's own breathing, including in combination: a body member having a hollow chamber with an inlet and an outlet for anesthetic gas, an outlet for anesthetic gas connectable to a patient, and a passage; a bellows having a centrally open fixed end closed against said body and a movable end, the interior of said bellows defining a variable capacity chamber connected by said passage to said hollow chamber; a bellows housing enclosing said bellows and sealed against its fixed end to define a bellows-enclosing chamber, said housing having an inlet; a patient-actuated respirator device of the type controllable by the breathing cycle of the patient and having a pressure-actuated exhaust valve and an outlet connected to said exhaust valve and to said inlet of said bellows housing, so that said respirator device is separated from a patient's lungs by said bellows; inhalation-actuated means for actuating said respirator device when the patient inhales to send airflow into said chamber to force said bellows toward a closed position; and exhalation-actuated mean for stopping said airflow when said patient exhales, so that said bellows then enlarges and forces air out of said bellows-enclosing chamber and through said exhaust valve.

13. A device for use with a respirator for administering anesthetic gas, including in combination: a body member having a hollow interior defining a first chamber for anesthetic gas with an inlet and an outlet; a vertically mounted bellows having a fixed upper end secured to said body member and a reinforced movable lower end, the interior of said bellows defining a variable capacity chamber; passage means in said body connecting said variable capacity chamber to said first chamber; a bellows housing enclosing said bellows and defining a bellows-enclosing chamber, said housing having means for connection with a respirator so that variation in the pressure in said bellows-enclosing chamber acts on said bellows to vary the capacity of said variable capacity chamber; a vertical member slidably mounted in said body and extending through said body into said bellows through said fixed end and having a lower end in contact with said movable end of said bellows for movement thereby when said bellows opens and collapses, and having an upper end extending above and beyond said body; a gauge calibrated in terms of the gas volume of said variable capacity chamber; and means connecting said gauge to the upper end of said vertical member for indicating the volume of gas expelled from said bellows.

14. A device used in connection with a respirator for administering anesthetic gas, including in combination: a body member having a hollow interior defining a first chamber with an inlet and an outlet, both for anesthetic gas; a bellows having an upper fixed end and a reinforced movable lower end, the interior of said bellows defining a variable capacity chamber connected to said first chamber; a bellows housing enclosing said bellows and having an inlet adapted to be connected to a respirator for varying the pressure in said housing and thereby actuating said bellows; an exhaust tube slidably mounted vertically in said body and extending through said body and into the interior of said bellows, with a lower end in contact with said reinforced movable end of said bellows and moved when said bellows opens and collapses, and having an upper end above said body, said tube having opening means adjacent each end; a slidable exhaust valve on said upper end of said tube; weight means normally bearing on said exhaust valve and closing it and moving with it in a lost-motion connection to hold said exhaust valve closed; and means for stopping the movement of said weight means while said valve moves further down.

15. The device of claim 14 having a gauge actuated by movement of said weight means to indicate the volume of gas displaced in said bellows by the administration of said gas to a patient uninfluenced by gas transfer from said bellows through said exhaust valve.

16. A device for use with a respirator in administering anesthetic gas, including in combination: a body member having a conduit for said gas with an inlet and an outlet and passage means, said body also having a lower side and an upper side; a vertically disposed bellows having an open upper fixed end closed against said lower side of said body and a reinforced lower movable end, the interior of said bellows defining a variable capacity chamber connected to said conduit by said passage means; a bellows housing enclosing said bellows and sealed against its upper end to define a bellows-enclosing chamber, the pressure in which actuates said bellows, said bellows housing having an inlet adapted for connection with a respirator to vary the pressure in said bellows-enclosing chamber; and exhaust tube slidably mounted vertically in said body and extending through said body and into said bellows through said upper end and normally urged downwardly by gravity with its lower end in contact with said reinforced lower end of said bellows and moved up thereby when said bellows is collapsed, said tube having opening means adjacent its lower end and an open upper end; a gas leak valve movable with said tube and normally closing the upper end of said tube but mounted for vertical sliding action away therefrom, said valve having an upwardly extending stem; vertically movable lost-motion means normally moving with said gas leak valve for closing said gas leak valve when in contact therewith; and stop means for preventing said lost-motion means from moving down with said gas leak valve at the lower end of its stroke.

References Cited in the file of this patent

UNITED STATES PATENTS

| | | |
|---|---|---|
| 2,385,786 | Brubach et al. | Oct. 2, 1945 |
| 2,391,877 | Cahan | Jan. 1, 1946 |
| 2,593,774 | Loredo | Apr. 22, 1952 |
| 2,596,178 | Seeler | May 13, 1952 |
| 2,766,753 | Koch et al. | Oct. 16, 1956 |
| 2,890,696 | Morris | June 16, 1959 |
| 2,904,034 | Haupt | Sept. 15, 1959 |
| 2,969,789 | Morch | Jan. 31, 1961 |